(12) United States Patent
Johansson et al.

(10) Patent No.: US 12,192,943 B2
(45) Date of Patent: Jan. 7, 2025

(54) STORAGE OF NETWORK SLICE AUTHORIZATION STATUS

(71) Applicant: Telefonaktiebolaget LM Ericsson (publ), Stockholm (SE)

(72) Inventors: Kaj Johansson, Gothenburg (SE); Peter Hedman, Helsingborg (SE); David Castellanos Zamora, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 418 days.

(21) Appl. No.: 17/771,381

(22) PCT Filed: Nov. 5, 2020

(86) PCT No.: PCT/EP2020/081144
§ 371 (c)(1),
(2) Date: Apr. 22, 2022

(87) PCT Pub. No.: WO2021/089703
PCT Pub. Date: May 14, 2021

(65) Prior Publication Data
US 2023/0232356 A1     Jul. 20, 2023

Related U.S. Application Data

(60) Provisional application No. 62/932,665, filed on Nov. 8, 2019.

(51) Int. Cl.
*H04W 12/06* (2021.01)
*H04W 48/18* (2009.01)
*H04W 60/00* (2009.01)

(52) U.S. Cl.
CPC .......... *H04W 60/00* (2013.01); *H04W 12/06* (2013.01); *H04W 48/18* (2013.01)

(58) Field of Classification Search
CPC ...... H04W 60/00; H04W 12/09; H04W 48/18
See application file for complete search history.

(56) References Cited

U.S. PATENT DOCUMENTS

| 2020/0162919 A1* | 5/2020 | Velev ................ H04L 63/0892 |
| 2021/0058784 A1* | 2/2021 | Kedalagudde ........ H04W 48/18 |
| 2023/0232356 A1* | 7/2023 | Johansson ............. H04W 48/18 455/411 |

OTHER PUBLICATIONS

International Search Report and Written Opinion of the International Searching Authority for PCT International Application No. PCT/EP2020/081144 dated Apr. 29, 2021.
(Continued)

*Primary Examiner* — Michael T Vu
(74) *Attorney, Agent, or Firm* — Sage Patent Group

(57) ABSTRACT

A method of operating a core network node in a communication system includes receiving, at a first network function, a registration message from a radio access network node to register a user equipment, UE, and, responsive to the registration message, transmitting a request for information on whether network slices associated with the UE are subject to Network Slice-Specific Authentication and Authorization, NSSAA. Responsive to the request, the method receives a response message including Single-Network Slice Selection Assistance Information, S-NSSAI, information associated with the UE, the S-NSSAI information including NSSAA status information relating to the S-NSSAI information, and determines whether to initiate an NSSAA procedure with the UE based on the S-NSSAI information. Related network nodes are disclosed.

12 Claims, 24 Drawing Sheets

(56) References Cited

OTHER PUBLICATIONS

3GPP TS 23.502 V16.2.0, "3rd Generation Partnership Project; Technical Specification Group Services and System Aspects; Procedures for the 5G System (5GS); Stage 2 (Release 16)," Sep. 2019, 525 pages.
NEC, "Preventing UE waiting for completion of NSSAA indefinitely—Atl1 NW timer," C1-198368, 3GPP TSG-CT WG1 Meeting #121, Reno (NV), USA, Nov. 11-15, 2019, 13 pages.
Ericsson, "Network Slice Specific Authentication and Authorization Correction," S2-1909796, 3GPP SA WG2 Meeting #135, Split, HR, Oct. 14-18, 2019, 5 pages.
Nokia et al., "Editor's note removal on role of AUSF," S2-1910342, 3GPP TSG-SA WG Meeting # 135, Split, Croatia, Oct. 14-18, 2019, 6 pages.
3GPP TS 29.503 V16.1.0, "3rd Generation Partnership Project; Technical Specification Group Core Network and Terminals; 5G System; Unified Data Management Services; Stage 3 (Release 16)," Sep. 2019, 234 pages.
SA2, "Reply LS on AUSF role in slice specific authentication," C3-195182, 3GPP TSG-CT WG3 Meeting #107, Reno, US; Nov. 11-15, 2019, 2 pages.

* cited by examiner

STORAGE OF NETWORK SLICE AUTHORIZATION STATUS

CROSS REFERENCE TO RELATED APPLICATIONS

This application is a 35 U.S.C. § 371 national stage application of PCT International Application No. PCT/EP2020/081144 filed on Nov. 5, 2020, which claims the benefit of U.S. Provisional Patent Application Ser. No. 62/932,665, filed on Nov. 8, 2019, the disclosures and content of which are incorporated by reference herein in their entireties.

BACKGROUND

The present disclosure relates generally to communications, and more particularly, to wireless communications and related wireless devices and network nodes.

A simplified wireless communication system is illustrated in FIG. 1. The system includes a UE 100 that communicates with one or more access nodes 210, 220 using radio connections 107, 108. The access nodes 210, 220 are connected to a core network node 106. The access nodes 210-220 are part of a radio access network 105.

For wireless communication systems pursuant to 3GPP Evolved Packet System, EPS (also referred to as Long Term Evolution, LTE, or 4G) standard specifications, such as specified in 3GPP TS 36.300 and related specifications, the access nodes 210, 220 correspond typically to an Evolved NodeB (eNB) and the core network node 106 corresponds typically to either a Mobility Management Entity (MME) and/or a Serving Gateway (SGW). The eNB is part of the radio access network 105, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, such as specified in 3GPP TS 38.300 and related specifications, the access nodes 103-104 correspond typically to a 5G NodeB (gNB) and the network node 106 corresponds typically to either an Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC).

The 5G System consists of the access network and the core network. The Access Network (AN) is the network that allows the UE to gain connectivity to the Core Network (CN), e.g. the base station which could be a gNB or an ng-eNB in 5G. The CN contains all the Network Functions (NF) ensuring a wide range of different functionalities such as session management, connection management, charging, authentication, etc.

FIG. 2, which is reproduced from [2] gives a high-level overview of the 5G architecture for the non-roaming scenario.

In 5GS Rel 16, a new feature referred to as Network Slice-Specific Authentication and Authorization (NSSAA) is specified. NSSAA has not been specified for the 4G evolved packet system (EPS).

In NSSAA, after a successful registration procedure, the access and mobility function (AMF), initiates the NSSAA procedure for each network (NW) slice (i.e., each requested Single-Network Slice Selection Assistance Information, S-NSSAI) indicated in the subscription as subject to NSSAA by requesting an extensible authentication protocol (EAP) ID for each S-NSSAI from the UE. The AMF notifies an external authentication, authorization and accounting (AAA) server together with the EAP-ID and S-NSSAI information to start NSSAA for one or more by UE requested S-NSSAI(s).

The UE is informed along with the registration accept message that the NW slices associated with the S-NSSAIs are subject to NSSAA. When the NSSAA procedures are completed, the AMF will update the UE with the results. For each successful NSSAA procedure, the UE can start to use the corresponding NW slice. In case of an unsuccessful NSSAA procedure, the corresponding NW slice cannot be used by the UE until a local policy removes the restriction and it can be requested again.

The AAA server may be stateless, meaning that the AAA server does not store any information regarding whether a specific NW slice is already authorized for an EAP ID, or it may be stateful, meaning that it stores such information.

FIG. 3 illustrates an NSSAA procedure sequence reproduced from [1]. As shown therein, the interactions between the AMF and the AAA-S involve a Network Slice-Specific Authentication and Authorization (NSSAAF) in the HPLMN of the UE. The NSSAAF acts as an inter-working function (IWF) that translates NSSAA-related service based interface (SBI) service operations initiated by the AMF to AAA native protocols (e.g. radius or diameter) used by the AAA-S.

In addition to the NSSAA procedure shown in FIG. 1, [1] also defines mechanisms for AAA-S initiated re-authentication and revocation. For these procedures, the NSSAAF is also responsible to discover and select the AMF serving the UE at that point in time.

REFERENCES

[1] 3GPP TS 23.502 v16.2.0, v16.6.0
[2] 3GPP TS 23.501 v16.2.0, v16.6.0
[3] 3GPP TS 29.503 v16.2.0, v16.6.0

SUMMARY

Some embodiments described herein may reduce unnecessary signalling over the 5GS air interface and in the 5G network when the UE moves back to 5GS from EPS while maintaining PDU sessions associated with authorized NW slices. Some embodiments may further help ensure that it is possible to disallow the UE from using network slices that require NSSAA when the UE is served by NFs not supporting NSSAA.

Accordingly, a method of operating a core network node in a communication system includes receiving, at a first network function, a registration message from a radio access network node to register a user equipment, UE, and, responsive to the registration message, transmitting a request for information on whether network slices associated with the UE are subject to Network Slice-Specific Authentication and Authorization, NSSAA. Responsive to the request, the method receives a response message including Single-Network Slice Selection Assistance Information, S-NSSAI, information associated with the UE, the S-NSSAI information including NSSAA status information relating to the S-NSSAI information, and determines whether to initiate an NSSAA procedure with the UE based on the S-NSSAI information. In some embodiments, the method includes initiating the NSSAA procedure with the UE based on the S-NSSAI information.

The request for information on whether the UE is subject to NSSAA may be contained in a request message for subscriber data management, SDM, information transmitted by the first network function to a second network function.

The request message may include a Nudm_SDM_Get request message and the response message may include a Nudm_SDM_GetResp response message.

The S-NSSAI information may include a list of S-NSSAIs associated with the UE.

The S-NSSAI information may include, for each S-NSSAI in the list of S-NSSAIs, an indication of whether the S-NSSAI is subject to NSSAA.

The registration message may be transmitted in connection with an intra-system mobility procedure or in connection with an inter-system mobility procedure.

The method may further include initiating the NSSAA procedure in response to the S-NSSAI information.

A network node according to some embodiments is configured to receive, at a first network function, a registration message from a radio access network node to register a user equipment, UE, and, responsive to the registration message, transmit a request for information on whether network slices associated with the UE are subject to Network Slice-Specific Authentication and Authorization, NSSAA. The network node is further configured, responsive to the request, to receive a response message including Single-Network Slice Selection Assistance Information, S-NSSAI, information associated with the UE, the S-NSSAI information including NSSAA status information relating to the S-NSSAI information, and determine whether to initiate an NSSAA procedure with the UE based on the S-NSSAI information.

A network node according to some embodiments includes a processing circuit, a network interface coupled to the processing circuit, and a memory coupled to the processing circuit. The memory includes computer readable program instructions that, when executed by the processing circuit, cause the network node to perform operations including receiving, at a first network function, a registration message from a radio access network node to register a user equipment, UE, responsive to the registration message, transmitting a request for information on whether network slices associated with the UE are subject to Network Slice-Specific Authentication and Authorization, NSSAA, responsive to the request, receiving a response message including Single-Network Slice Selection Assistance Information, S-NSSAI, information associated with the UE, the S-NSSAI information including NSSAA status information relating to the S-NSSAI information, and determining whether to initiate an NSSAA procedure with the UE based on the S-NSSAI information.

A method of operating a core network node in a communication system according to some embodiments includes initiating a Network Slice-Specific Authentication and Authorization, NSSAA procedure for a user equipment, UE, receiving an authentication result message indicating success or failure of the NSSAA procedure, and storing a result of the NSSAA procedure.

The authentication result message may include an NSSAA procedure result associated with a Single-Network Slice Selection Assistance Information, S-NSSAI.

Storing the result of the NSSAA procedure may include storing the result of the NSSAA procedure in association with the S-NSSAI.

Storing the result of the NSSAA procedure may include storing a Generic Public Subscription Identifier, GPSI, of the UE in association with the S-NSSAI.

Storing the result of the NSSAA procedure may include storing a Subscriber Permanent Identifier, SUPI, of the UE in association with the S-NSSAI.

Storing the result of the NSSAA procedure may include transmitting the result of the NSSAA procedure to a unified data management, UDM, function for storage.

Storing the result of the NSSAA procedure may include storing a timestamp in association with the result of the NSSAA procedure.

The method may further include receiving an authentication request to perform NSSAA for the UE, and the NSSAA procedure may be initiated in response to the authentication request.

The method may further include storing the result in an access and mobility function, AMF, of the communication system.

A network node according to some embodiments is configured to initiate a Network Slice-Specific Authentication and Authorization, NSSAA, procedure for a user equipment, UE, receive an authentication result message indicating success or failure of the NSSAA procedure, and store a result of the NSSAA procedure.

A network node according to some embodiments includes a processing circuit, a network interface coupled to the processing circuit, and a memory coupled to the processing circuit. The memory includes computer readable program instructions that, when executed by the processing circuit, cause the network node to perform operations including initiating a Network Slice-Specific Authentication and Authorization, NSSAA, procedure for a user equipment, UE, receiving an authentication result message indicating success or failure of the NSSAA procedure, and storing a result of the NSSAA procedure.

A method of operating a core network node in a communication system according to some embodiments includes receiving, at a source network function, a request to transfer a user equipment, UE, context to a target network function, responsive to the request, determining whether the target network function AMF supports Network Slice-Specific Authentication and Authorization, NSSAA, preparing, a UE context for the UE, wherein the UE context excludes NSSAA related information when the target AMF does not support NSSAA, and transmitting the UE context to the target network function.

The UE context may include a list of Single-Network Slice Selection Assistance Information, S-NSSAI, associated with the UE, and the list of S-NSSAI may exclude S-NSSAI that are subject to NSSAA.

Determining whether the target network function supports NSSAA may include checking a network function profile of the target network function at a network repository function, NRF.

The source network function may include a source access and mobility function, and the target network function may include a target access and mobility function.

A network node according to some embodiments is configured to receive, at a source network function network function, a request to transfer a user equipment, UE, context to a target network function, responsive to the request, determine whether the target network function supports Network Slice-Specific Authentication and Authorization, NSSAA, prepare, a UE context for the UE, wherein the UE context excludes NSSAA related information when the target network function does not support NSSAA, and transmit the UE context to the target network function.

A network node according to some embodiments includes a processing circuit, a network interface coupled to the processing circuit, and a memory coupled to the processing circuit. The memory includes computer readable program instructions that, when executed by the processing circuit, cause the network node to perform operations including receiving, at a source network function, a request to transfer a user equipment, UE, context to a target network function, responsive to the request, determining whether the target AMF supports Network Slice-Specific Authentication and Authorization, NSSAA, preparing, a UE context for the UE, wherein the UE context excludes NSSAA related information when the target network function does not support NSSAA, and transmitting the UE context to the target network function.

A method of operating a core network node in a communication system according to some embodiments includes receiving, at a first network function, a network slice-specific re-authentication or revocation request for a user equipment, UE, from an Authentication, Authorization and Accounting function, AAA, requesting an identity of an access and mobility function, AMF, serving the UE, determining whether the AMF supports Network Slice-Specific Authentication and Authorization, NSSAA, and in response to determining that the AMF supports NSSAA, performing the network slice-specific re-authentication or revocation.

The first network function may include a network slice-specific authentication and authorization function, NSSAAF.

The method may further include storing a result of the network slice-specific re-authentication or revocation along with a Single-Network Slice Selection Assistance Information, S-NSSAI, associated with the UE.

The result of the network slice-specific re-authentication or revocation may be stored in a unified data management function, UDM.

The method may further include, in response to determining that the AMF does not support NSSAA, informing the AAA of an error condition.

Determining whether the AMF supports NSSAA may include receiving, with the identity of the AMF serving the UE, an indication of whether the AMF supports NSSAA.

A network node according to some embodiments is configured to receive, at a first network, a network slice-specific re-authentication or revocation request for a user equipment, UE, from an Authentication, Authorization and Accounting function, AAA, request an identity of an access and mobility function, AMF, serving the UE, determine whether the AMF supports Network Slice-Specific Authentication and Authorization, NSSAA, and in response to determining that the AMF supports NSSAA, perform the network slice-specific re-authentication or revocation.

A network node according to some embodiments includes a processing circuit, a network interface coupled to the processing circuit, and a memory coupled to the processing circuit. The memory includes computer readable program instructions that, when executed by the processing circuit, cause the network node to perform operations including receiving, at a first network function, a network slice-specific re-authentication or revocation request for a user equipment, UE, from an Authentication, Authorization and Accounting function, AAA, requesting an identity of an access and mobility function, AMF, serving the UE, determining whether the AMF supports Network Slice-Specific Authentication and Authorization, NSSAA, and in response to determining that the AMF supports NSSAA, performing the network slice-specific re-authentication or revocation.

A method of operating a network node in a communication system according to some embodiments includes receiving a result of a network slice-specific re-authentication or revocation for a user equipment, UE, and a Single-Network Slice Selection Assistance Information, S-NSSAI, associated with the UE, and storing the S-NSSAI in association with the result of a network slice-specific re-authentication or revocation.

The core network node may include a unified data management function, UDM, node, an access and mobility function, AMF, node, and/or a network slice-specific authentication and authorization function, NSSAAF.

A network node according to some embodiments is configured to receive a result of a network slice-specific re-authentication or revocation for a user equipment, UE, and a Single-Network Slice Selection Assistance Information, S-NSSAI, associated with the UE, and store the S-NSSAI in association with the result of a network slice-specific re-authentication or revocation.

A network node according to some embodiments includes a processing circuit, a network interface coupled to the processing circuit, and a memory coupled to the processing circuit. The memory includes computer readable program instructions that, when executed by the processing circuit, cause the network node to perform operations including receiving a result of a network slice-specific re-authentication or revocation for a user equipment, UE, and a Single-Network Slice Selection Assistance Information, S-NSSAI, associated with the UE, and storing the S-NSSAI in association with the result of a network slice-specific re-authentication or revocation.

A method of operating a core network node in a communication system according to some embodiments includes receiving a result of a Network Slice-Specific Authentication and Authorization, NSSAA procedure for a user equipment, UE associated with a Single-Network Slice Selection Assistance Information, S-NSSAI, determining that an access and mobility function, AMF, serving the UE does not support NSSAA, and in response to determining that the AMF, serving the UE does not support NSSAA, storing a result of the NSSAA procedure in association with the S-NSSAI.

Storing the result of the NSSAA procedure may include storing a Generic Public Subscription Identifier, GPSI, of the UE in association with the S-NSSAI.

Storing the result of the NSSAA procedure may include storing a Subscriber Permanent Identifier, SUPI, of the UE in association with the S-NSSAI.

Storing the result of the NSSAA procedure may include transmitting the result of the NSSAA procedure to a unified data management, UDM, function for storage.

Storing the result of the NSSAA procedure may include storing a timestamp in association with the result of the NSSAA procedure.

A network node according to some embodiments is configured to receive a result of a Network Slice-Specific Authentication and Authorization, NSSAA procedure for a user equipment, UE associated with a Single-Network Slice Selection Assistance Information, S-NSSAI, determine that an access and mobility function, AMF, serving the UE does not support NSSAA, and in response to determining that the AMF, serving the UE does not support NSSAA, store a result of the NSSAA procedure in association with the S-NSSAI.

A network node according to some embodiments includes a processing circuit, a network interface coupled to the processing circuit, and a memory coupled to the processing circuit. The memory includes computer readable program instructions that, when executed by the processing circuit, cause the network node to perform operations including receiving a result of a Network Slice-Specific Authentication and Authorization, NSSAA procedure for a user equipment, UE associated with a Single-Network Slice Selection Assistance Information, S-NSSAI, determining that an access and mobility function, AMF, serving the UE does not support NSSAA, and in response to determining that the AMF, serving the UE does not support NSSAA, storing a result of the NSSAA procedure in association with the S-NSSAI.

A method of operating a core network node in a communication system according to some embodiments includes receiving, at a packet gateway, PGW, a packet data network connection establishment request to establish a packet data connection with a user equipment, UE, selecting, for association with the packet data connection, a Single-Network Slice Selection Assistance Information, S-NSSAI, to which the UE is subscribed, determining whether the selected S-NSSAI supports Network Slice-Specific Authentication and Authorization, NSSAA procedures, and in response to determining that the selected S-NSSAI supports NSSAA procedures, selecting an alternate S-NSSAI for association with the packet data connection.

Determining whether the selected S-NSSAI supports NSSAA procedures may include retrieving the selected S-NSSAI from a unified data management, UDM, function in the communication system.

The method may further include determining whether any S-NSSAI to which the UE is subscribed is not subject to NSSAA, and in response to determining that no S-NSSAI to which the UE is subscribed is not subject to NSSAA, rejecting the packed data connection establishment request.

The method may further include in response to determining that the selected S-NSSAI supports NSSAA procedures, transmitting the selected S-NSSAI to the UE.

A network node according to some embodiments is configured to receive, at a packet gateway, PGW, a packet data network connection establishment request to establish a packet data connection with a user equipment, UE, select, for association with the packet data connection, a Single-Network Slice Selection Assistance Information, S-NSSAI, to which the UE is subscribed, determine whether the selected S-NSSAI supports Network Slice-Specific Authentication and Authorization, NSSAA procedures, and in response to determining that the selected S-NSSAI supports NSSAA procedures, select an alternate S-NSSAI for association with the packet data connection.

A network node according to some embodiments includes a processing circuit, a network interface coupled to the processing circuit, and a memory coupled to the processing circuit. The memory includes computer readable program instructions that, when executed by the processing circuit, cause the network node to perform operations including receiving, at a packet gateway, PGW, a packet data network connection establishment request to establish a packet data connection with a user equipment, UE, selecting, for association with the packet data connection, a Single-Network Slice Selection Assistance Information, S-NSSAI, to which the UE is subscribed, determining whether the selected S-NSSAI supports Network Slice-Specific Authentication and Authorization, NSSAA procedures, and in response to determining that the selected S-NSSAI supports NSSAA procedures, selecting an alternate S-NSSAI for association with the packet data connection.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
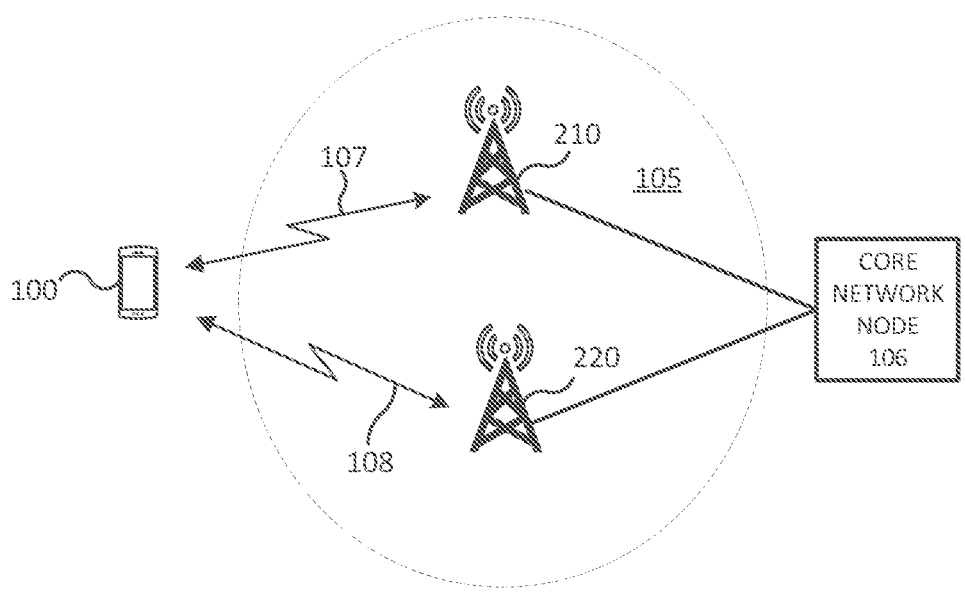
FIG. 1 illustrates a wireless communication system.
Figure 2:
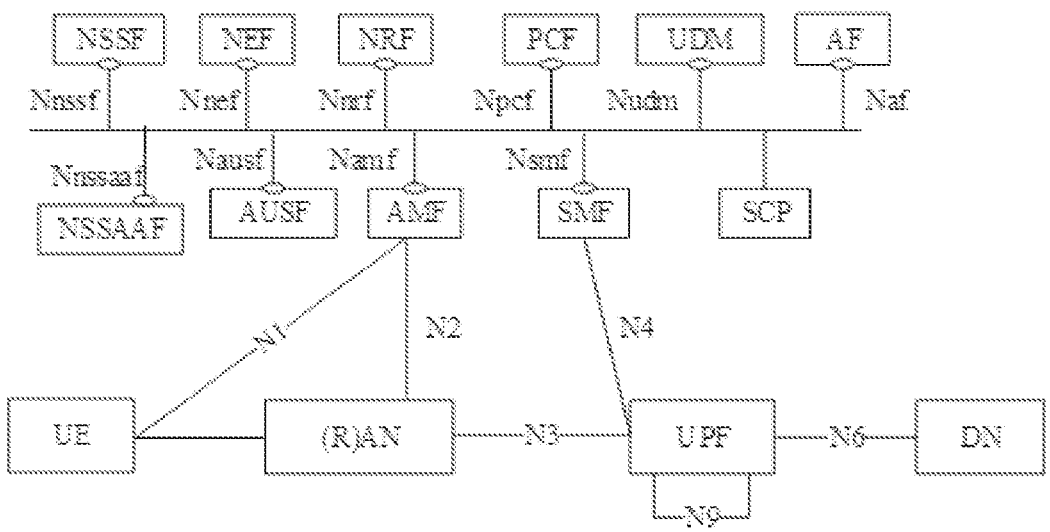
FIG. 2 illustrates a non-roaming reference architecture of a wireless communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As noted above, in a 5GS core network, network slices, identified by Single-Network Slice Selection Assistance Information (S-NSSAI) may be subject to Network slice-specific authentication and authorization (NSSAA). However, EPS does not support network slices, and some AMF may not support NSSAA. This can lead to unnecessary signalling overhead due to mobility.

For example, assume a UE registers in 5GS and requests NW slices A, B and C, where NW slices A and B are both subject to Network slice-specific authentication and authorization (NSSAA). After the registration procedure is successfully completed, the NSSAA procedure starts for both slice A and B and completes successfully. This is stored in the UE context. When the UE performs an inter-system change from 5GS to EPS, the UE context may be discarded in old AMF, which is the normal case. Hence, in that case, the NSSAA related information will also be dropped.

Sometime later, when the UE performs an inter-system change back to 5GS from EPS while still using NW slices A, B, and C for its PDU sessions, the new AMF will not know the NSSAA status for slice A and B and hence must trigger the NSSAA procedure again for each NW slice A and B. This causes unnecessary signaling over the air interface and in the network.

In addition, if the AAA-S initiates revocation or re-authentication of an S-NSSAI while the UE is in EPS or is handled by an AMF that does not support the NSSAA, then there is no AMF to handle the procedure and therefore the procedure cannot be executed. The specifications do not cover these cases.

Some embodiments provide systems/methods whereby the result of an NSSAA procedure is stored, for example, by the NSSAAF in a unified data management (UDM) or unified data repository function (UDR). At a subsequent intersystem change from 5GS to EPS and then back to 5GS again, the target AMF retrieves the NSSAA related information for the subscribed S-NSSAIs from UDM. According to some embodiments, this information may be extended with the status of previous NSSAA procedures to be used by the AMF for the decision if to initiate the NSSAA procedure per requested NW slice.

Also, to handle the situation when AAA-S initiates revocation or re-authentication while the UE is served by NFs not supporting NSSAA (e.g. while in EPC or when connected in 5GC via AMFs not supporting NSSAA), some embodiments provide that the AMF informs UDM about the support (or not) of the NSSAA procedures. The support of NSSAA in AMF is used for the UDM to send to the AMF NSSAA related information or not and to decide whether to indicate to the AMF that the S-NSSAIs subject to NSSAA in the list are allowed or not. The knowledge about the support of NSSAA at the serving AMF may be stored in UDM for future use as described below.

According to further embodiments, in AAA-S initiated re-authentication or revocation procedures, the NSSAAF asks UDM about the serving AMF. If the AMF supports NSSAA, the UDM provides the AMF ID to the NSSAAF and the re-authentication or revocation procedure proceeds normally. Otherwise, if the serving AMF does not support NSSAA or if the UE is not registered in an AMF (e.g. the UE moved to EPS), the UDM provides the corresponding indication to the NSSAAF so that the NSSAAF informs the AAA-S accordingly.

Some embodiments may reduce unnecessary signalling over the 5GS air interface and in the 5G network when the UE moves back to 5GS from EPS maintaining PDU sessions associated with authorized NW slices. Some embodiments may further help ensure that it is possible to disallow the UE from using network slices that require NSSAA when the UE is served by NFs not supporting NSSAA.

UE Registration in 5GC

Figure 4A:
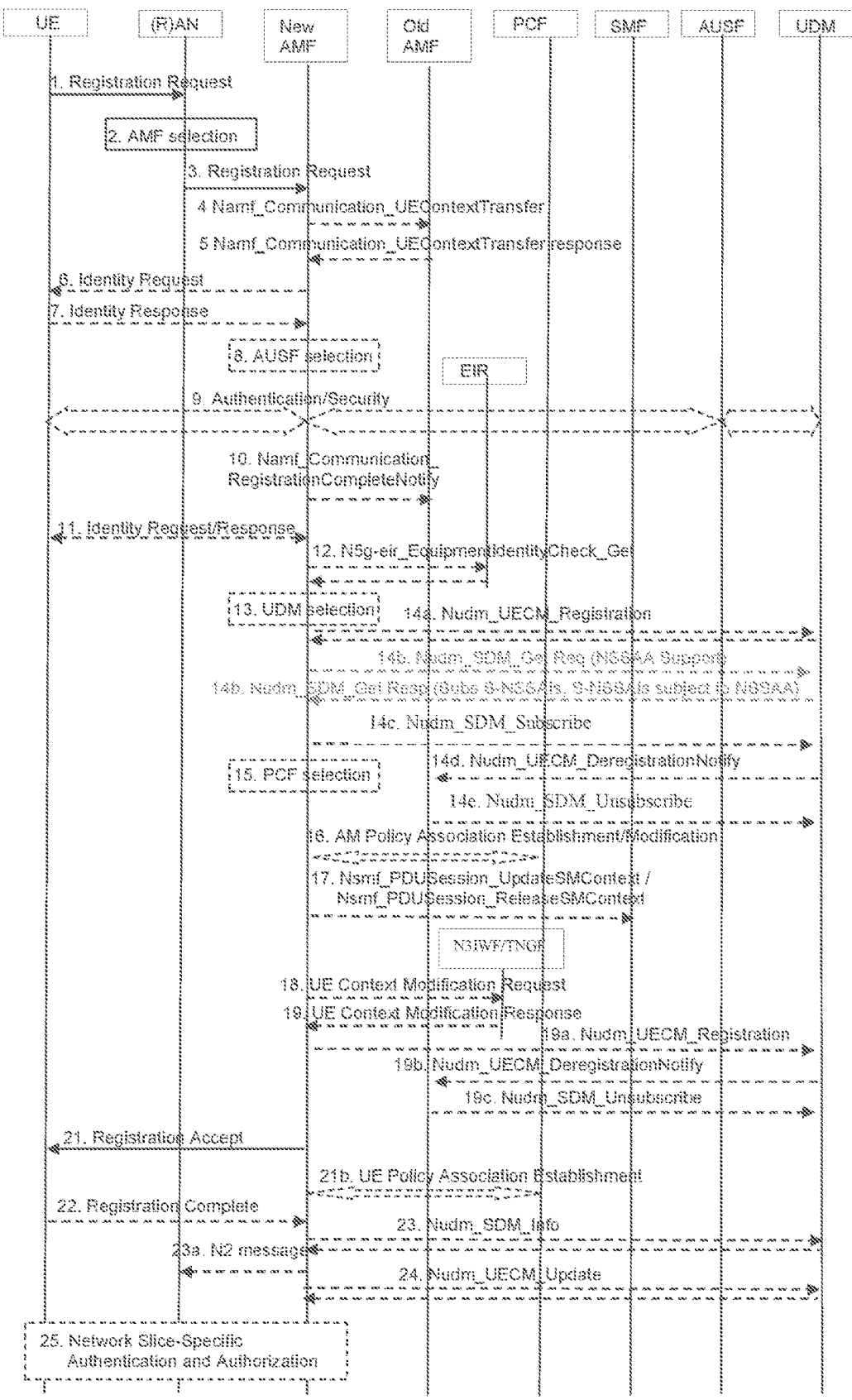
FIG. 4A illustrates a UE registration procedure according to some embodiments.

Some embodiments update the UE registration procedure defined in section 4.2.2.2.2 of [1] as depicted in FIG. 4A. According to some embodiments, the Nudm_SDM_Get service operation in step 14*b* of the Registration procedure shown in FIG. 4A may be modified include an indication of AMF support for the NSSAA procedures. This can be included as part of the feature negotiation defined in [3] for the Nudm_SDM API as shown in Table 1.

TABLE 1

Proposed Feature Name and Description

| Feature number | Feature Name | Description |
|---|---|---|
| 1 | Shared Data | When receiving a Nudm_SDM_Get service operation request to retrieve a UE's individual subscription data, and the request does not contain a supported-features query parameter indicating support of this feature, the UDM shall not include Shared Data Ids in the response. Instead the UDM may-based on operator policy-take no further action (i.e. allow the UE to get services based on only the UE's individual subscription data), or send the shared data as individual data (this may result in notifications of individual subscription data change-if so subscribed-when shared data, which are sent as individual data, are modified, and/or when the UE's Shared Data IDs are modified). |
| X | NSSAA | When receiving a Nudm_SDM_Get service operation request to retrieve Access and Mobility Subscription Data, and the request does not contain a supported-features query parameter indicating support of this feature, the UDM shall not include information about the execution of NSSAA procedures (e.g. list of S-NSSAIs subject to NSSAA) in the response to |

TABLE 1-continued

Proposed Feature Name and Description

| Feature number | Feature Name | Description |
|---|---|---|
| | | the AMF. Furthermore, the UDM shall not include the S-NSSAIs subject to NSSAA as part of the Subscribed S-NSSAI list provided to the AMF in order to prevent the UE from using S-NSSAIs requiring NSSAA when the UE is served by an AMF not supporting NSSAA. |

According to some embodiments, the Nudm_SDM_Get request may be a mandatory step during UE registration in 5GC for AMFs supporting NSSAA procedures. This is to ensure that an AMF supporting NSSAA procedures will always get the information regarding NSSAA execution even during inter AMF mobility procedures from an AMF not supporting NSSAA (i.e. which will not get information for the execution of NSSAA procedures and neither a complete list of subscribed S-NSSAIs).

The Nudm_SDM_Get operation is still shown as optional in FIG. 4A, as an AMF not supporting NSSAA may not trigger this step during inter AMF mobility procedures.

Figure 4B:
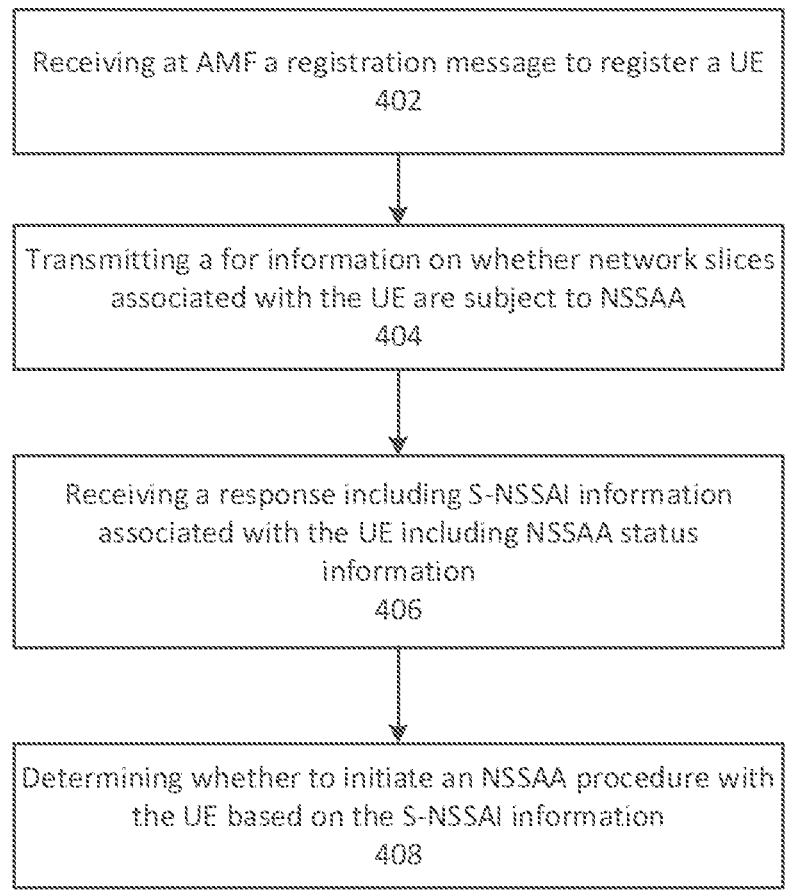
FIG. 4B is a flowchart that illustrates operations of a core network node according to some embodiments.

Accordingly, referring to FIG. 4B, a method of operating a core network node in a communication system includes receiving (402), at an access and mobility function, AMF, a registration message from a radio access network node to register a user equipment, UE, and responsive to the registration message, transmitting (404) a request for information on whether network slices associated with the UE are subject to Network Slice-Specific Authentication and Authorization, NSSAA. Responsive to the request, the network node receives (406) a response message including Single-Network Slice Selection Assistance Information, S-NSSAI, information associated with the UE, the S-NSSAI information including NSSAA status information relating to the S-NSSAI information, and determines (408) whether to initiate an NSSAA procedure with the UE based on the S-NSSAI information.

The request for information on whether the UE may be subject to NSSAA may be contained in a request message for subscriber data management, SDM, information transmitted by the AMF to a unified data management, UDM function.

The request message may include a Nudm_SDM_Get request message and the response message may include a Nudm_SDM_GetResp response message.

The S-NSSAI information may include a list of S-NSSAIs associated with the UE.

The S-NSSAI information may include, for each S-NSSAI in the list of S-NSSAIs, an indication of whether the S-NSSAI is subject to NSSAA.

The registration message may be transmitted in connection with an inter-AMF mobility procedure.

The registration message may be transmitted in connection with an inter-system mobility procedure.

The method may further include initiating the NSSAA procedure in response the S-NSSAI information.

Figure 10:
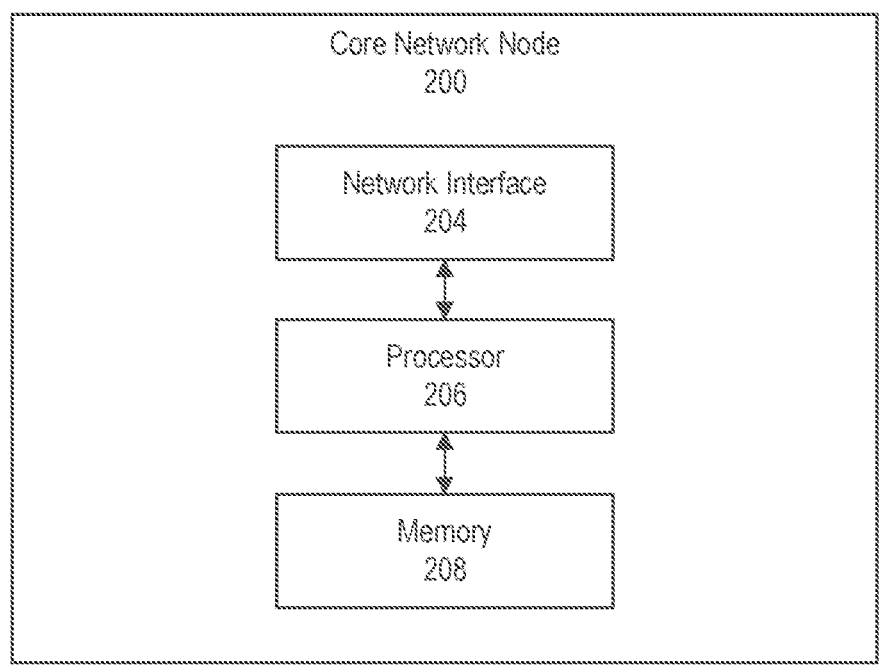
FIG. 10 is a block diagram illustrating an example of a core network (CN) node according to some embodiments.

Referring to FIGS. 4B and 10, a network node (200) according to some embodiments may be configured to receive (402), at an access and mobility function, AMF, a registration message from a radio access network node to register a user equipment, UE, responsive to the registration message, transmit (404) a request for information on whether network slices associated with the UE are subject to Network Slice-Specific Authentication and Authorization, NSSAA, responsive to the request, receive (406) a response message including Single-Network Slice Selection Assistance Information, S-NSSAI, information associated with the UE, the S-NSSAI information including NSSAA status information relating to the S-NSSAI information, and determine (408) whether to initiate an NSSAA procedure with the UE based on the S-NSSAI information.

Referring to FIGS. 4B and 10, a network node (200) according to some embodiments includes a processing circuit (206), a network interface (204) coupled to the processing circuit, and a memory (20) coupled to the processing circuit. The memory includes computer readable program instructions that, when executed by the processing circuit, cause the network node to perform operations including receiving (402), at an access and mobility function, AMF, a registration message from a radio access network node to register a user equipment, UE, responsive to the registration message, transmitting (404) a request for information on whether network slices associated with the UE are subject to Network Slice-Specific Authentication and Authorization, NSSAA, responsive to the request, receiving (406) a response message including Single-Network Slice Selection Assistance Information, S-NSSAI, information associated with the UE, the S-NSSAI information including NSSAA status information relating to the S-NSSAI information, and determining (408) whether to initiate an NSSAA procedure with the UE based on the S-NSSAI information.

NSSAA Result Status Storage During NSSAA Procedure

Figure 5A:
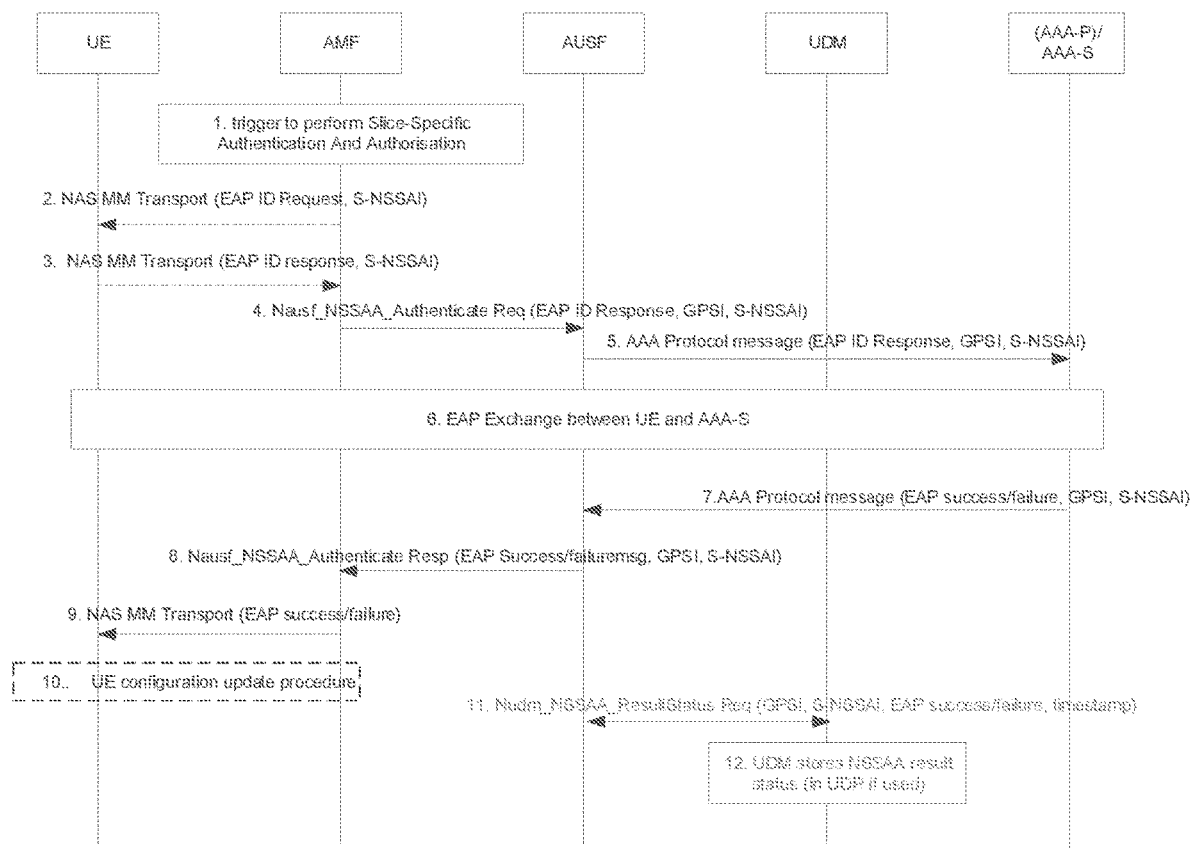
FIG. 5A illustrates a NSSAA result status storage procedure according to some embodiments.

Referring to FIG. 5A, some embodiments update the NSSAA procedure shown therein.

The NSSAA procedure shown in Figure 5A may be executed as currently defined, except that after NSSAAF receives the Auth Result EAP message (step 7) the NSSAAF informs the UDM with a new Nudm_NSSAA_ResultStatus service (step 11), or an equivalent service operation. The NSSAA Result is stored in UDM or UDR for future use.

The NSSAA Result Status information provided by the NSSAAF to the UDM includes the result of the NSSAA procedure (i.e. successful/unsuccessful) and a time stamp. The NSSAAF makes use of the UE's GPSI included within the NSSAA exchange between the AMF and the AAA-S.

The UDM then stores the NSSAA Result status (step 12). If the UDM makes use of a UDR, the UDM stores the NSSAA Result Status in UDR. The NSSAA Result Status information shall be stored in UDM on a per SUPI basis rather than on a GPSI basis. Therefore, before storing the NSSAA Result Status information, the UDM shall map the GPSI received by the NSSAAF to the corresponding SUPI. Alternatively, the NSSAAF may resolve the SUPI corresponding to the GPSI used during NSSAA procedure using the existing Nudm_SDM_Get (Identifier Translation) service operation before the storage of the NSSAA Result Status information in UDM (i.e. before step 11).

Figure 5B:
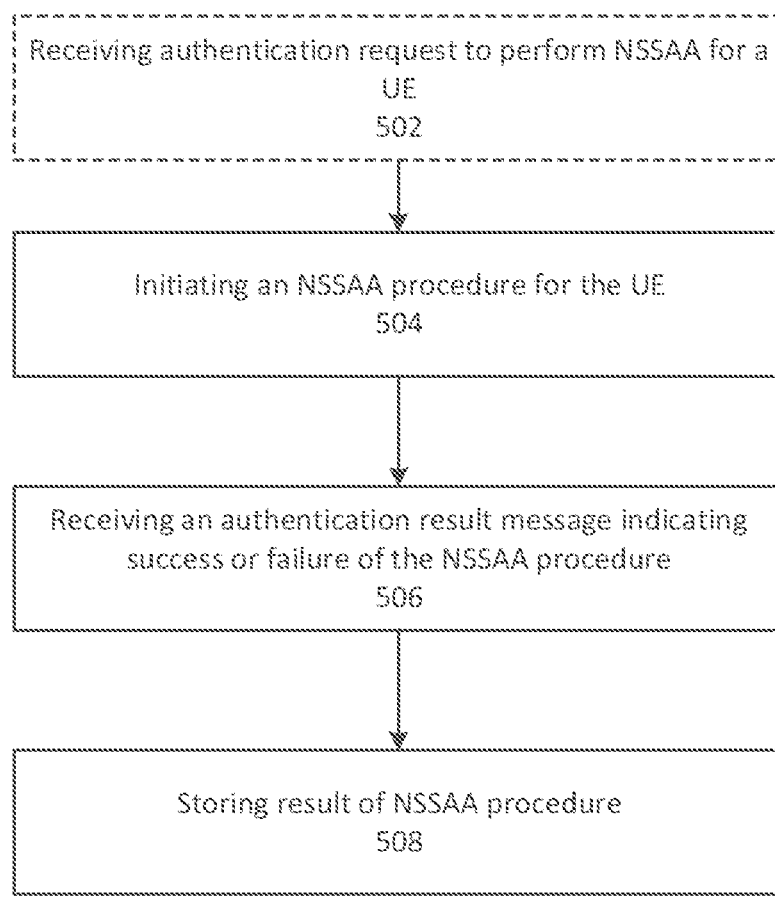
FIG. 5B is a flowchart that illustrates operations of a core network node according to some embodiments.

Accordingly, referring to FIG. 5B, a method of operating a core network node in a communication system includes initiating (504) a Network Slice-Specific Authentication and Authorization, NSSAA, procedure for a UE, receiving (506) an authentication result message indicating success or failure of the NSSAA procedure, and storing (508) a result of the NSSAA procedure.

The method may optionally include receiving (502) an authentication request to perform NSSAA for the UE.

The trigger for AMF to perform NSSAA can, for example, be the combination of Registration done and a Subscribed S-NSSAI is marked as subject for NSSAA in the subscription information received from UDM, or it can be a upon a request from the NSSAAF.

The authentication result message may include an NSSAA procedure result associated with a Single-Network Slice Selection Assistance Information, S-NSSAI.

Storing the result of the NSSAA procedure may include storing the result of the NSSAA procedure in association with the S-NSSAI.

Storing the result of the NSSAA procedure may include storing a Generic Public Subscription Identifier, GPSI, of the UE in association with the S-NSSAI.

Storing the result of the NSSAA procedure may include storing a Subscriber Permanent Identifier, SUPI, of the UE in association with the S-NSSAI.

Storing the result of the NSSAA procedure may include transmitting the result of the NSSAA procedure to a unified data management, UDM, function for storage.

Receiving the authentication request to perform NSSAA may include receiving the request at a network slice-specific authentication and authorization function, NSSAAF.

Storing the result of the NSSAA procedure may include storing a timestamp in association with the result of the NSSAA procedure.

Referring to FIGS. 5B and 10, a network node (200) according to some embodiments may be configured to receive (502) an authentication request to perform Network Slice-Specific Authentication and Authorization, NSSAA, for a user equipment, UE, initiate (504) an NSSAA procedure for the UE responsive to the authentication request, receive (506) an authentication result message indicating success or failure of the NSSAA procedure, and store (508) a result of the NSSAA procedure.

Referring to FIGS. 5B and 10, a network node (200) according to some embodiments includes a processing circuit (206), a network interface (204) coupled to the processing circuit, and a memory (20) coupled to the processing circuit. The memory includes computer readable program instructions that, when executed by the processing circuit, cause the network node to perform operations including receiving (502) an authentication request to perform Network Slice-Specific Authentication and Authorization, NSSAA, for a user equipment, UE, initiating (504) an NSSAA procedure for the UE responsive to the authentication request, receiving (506) an authentication result message indicating success or failure of the NSSAA procedure, and storing (508) a result of the NSSAA procedure.

Figure 5C:
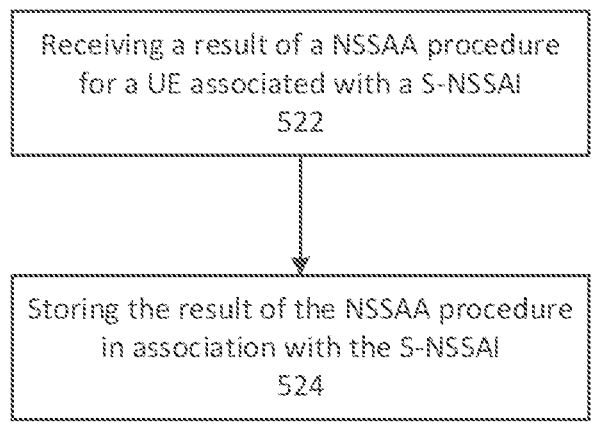
FIG. 5C is a flowchart that illustrates operations of a core network node according to some embodiments.
Figure 5D:
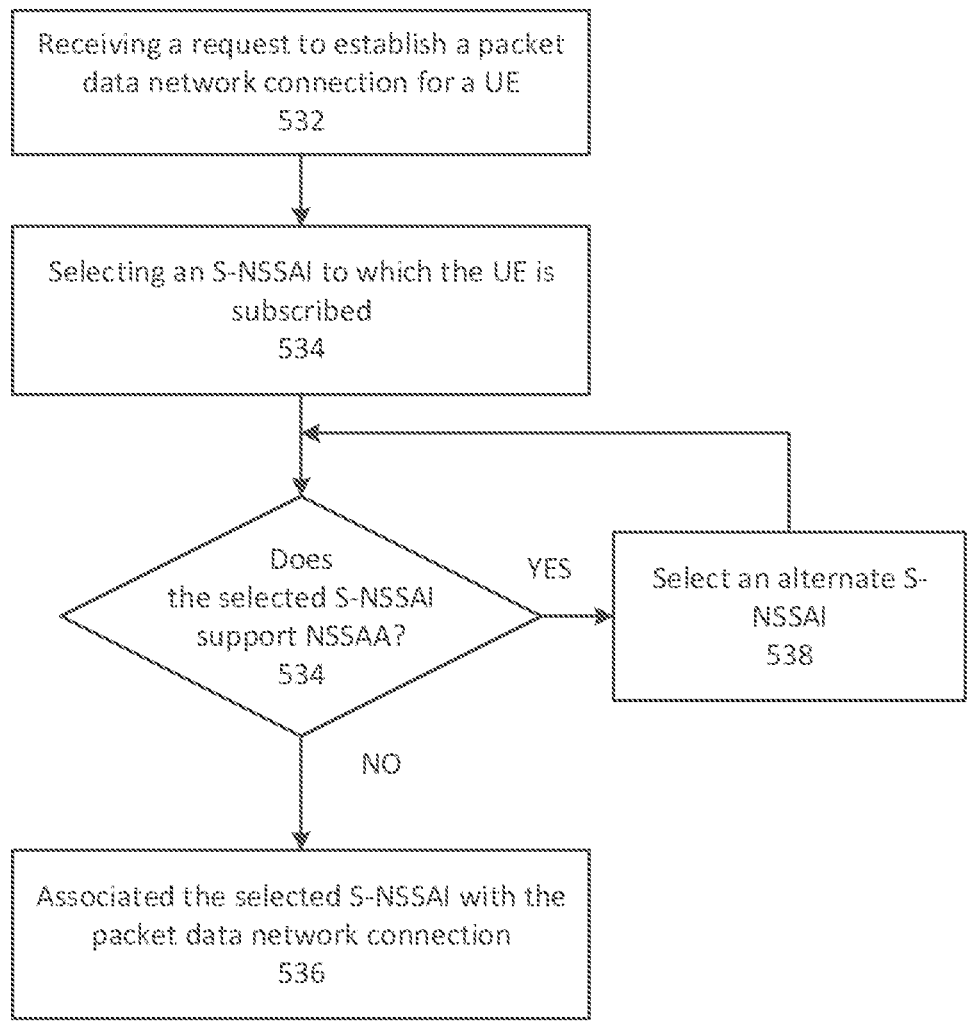
FIG. 5D is a flowchart that illustrates operations of a core network node according to some embodiments.

Referring to FIG. 5C, a method of operating a core network node (200) in a communication system according to some embodiments includes receiving (522) a result of a Network Slice-Specific Authentication and Authorization, NSSAA procedure for a user equipment, UE associated with a Single-Network Slice Selection Assistance Information, S-NSSAI, and storing (524) a result of the NSSAA procedure in association with the S-NSSAI.

Storing the result of the NSSAA procedure may include storing a Generic Public Subscription Identifier, GPSI, of the UE in association with the S-NSSAI.

Storing the result of the NSSAA procedure may include storing a Subscriber Permanent Identifier, SUPI, of the UE in association with the S-NSSAI.

Storing the result of the NSSAA procedure may include transmitting the result of the NSSAA procedure to a unified data management, UDM, function for storage.

Storing the result of the NSSAA procedure may include storing a timestamp in association with the result of the NSSAA procedure.

Referring to FIGS. 5C and 10, a network node (200) according to some embodiments is configured to receive (522) a result of a Network Slice-Specific Authentication and Authorization, NSSAA procedure for a user equipment, UE associated with a Single-Network Slice Selection Assistance Information, S-NSSAI, and store (524) a result of the NSSAA procedure in association with the S-NSSAI.

Referring to FIGS. 5C and 10, a network node (200) according to some embodiments includes a processing circuit (206), a network interface (204) coupled to the processing circuit, and a memory (208) coupled to the processing circuit, wherein the memory may include computer readable program instructions that, when executed by the processing circuit, cause the network node to perform operations including receiving (522) a result of a Network Slice-Specific Authentication and Authorization, NSSAA procedure for a user equipment, UE associated with a Single-Network Slice Selection Assistance Information, S-NSSAI, and storing (524) a result of the NSSAA procedure in association with the S-NSSAI.

Use of NSSAA Result Status During Subsequent Registration and NSSAA Procedure

Figure 6:
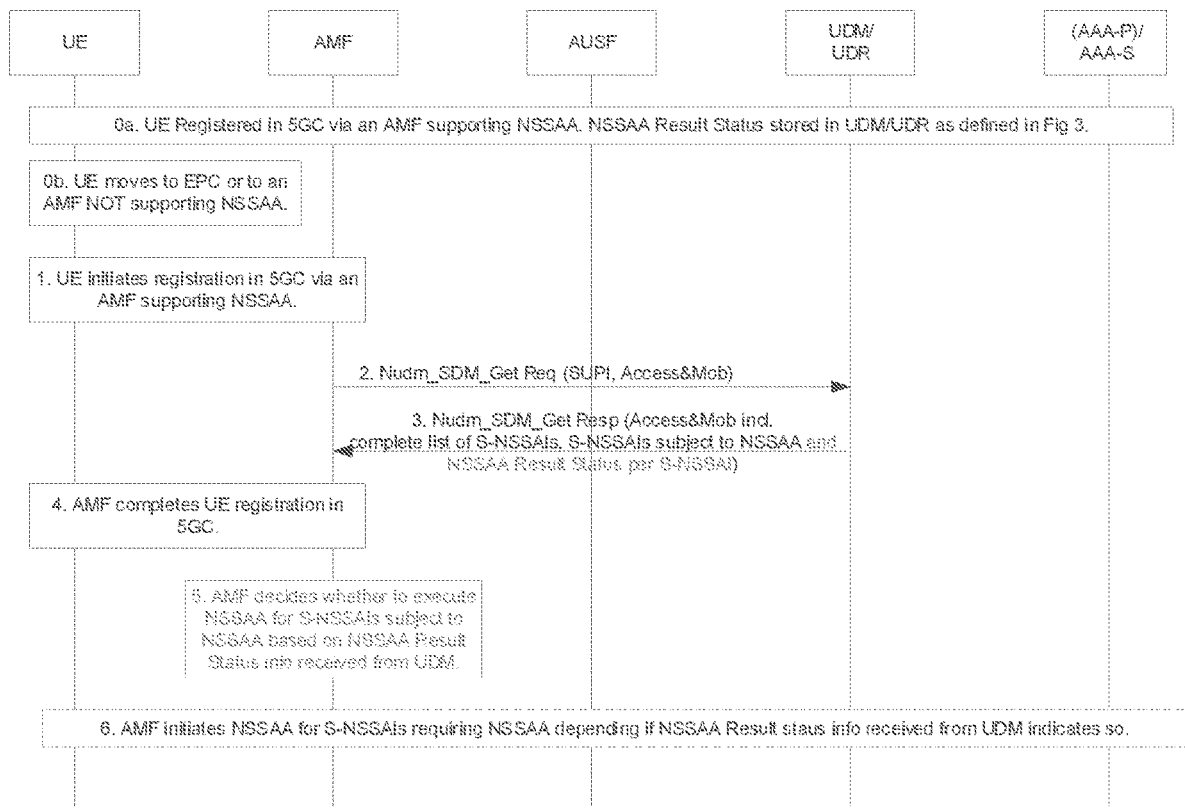
FIG. 6 illustrates a procedure for NSSAA result status usage during subsequent registration according to some embodiments.

Referring to FIG. 6, some embodiments provide procedures for when the UE moves back from EPC to 5GC or from an AMF that does not support NSSAA procedures to an AMF that supports NSSAA procedures.

Referring to FIG. 6, at step 0a, the UE registers in 5GC via an AMF supporting NSSAA and NSSAA procedures are executed as described above. This includes storage of the NSSAA Result Status in UDM/UDR.

At step 0b, the UE moves to EPC or to an AMF not supporting NSSAA procedures. The UE context in EPC or an AMF not supporting NSSAA does not include NSSAA specific info nor a complete list of subscribed S-NSSAIs (as the ones subject to NSSAA are not provided to an AMF not supporting NSSAA). The UE context in the original AMF is lost.

At step 1, the UE registers in 5GC via an AMF supporting NSSAA procedures.

At step 2, as part of the registration procedure, the AMF supporting NSSAA requests Access and Mobility subscription data to UDM using Nudm_SDM_Get Request service operation (AMF also indicate that it supports NSSAA as in 5.1). Since the UE comes from EPC or from an AMF not supporting NSSAA, it is mandatory for an AMF supporting NSSAA to get NSSAA related information from UDM as well as the complete list of subscribed S-NSSAIs.

At step 3, the UDM includes in the response to the AMF, the complete list of subscribed S-NSSAIs, the list of S-NSSAIs subject to NSSAA and additionally, according to some embodiments, the UDM also includes information related to NSSAA Result Status of previous NSSAA execution per S-NSSAI if available.

At step 4, the registration procedure is completed.

At step 5, in some embodiments, the AMF decides whether to initiate NSSAA procedures for those Subscribed S-NSSAIs subject to NSSAA based on the NSSAA Result status information received from UDM.

The NSSAA Result Status information provided by the UDM to AMF in step 4 may be the same information stored by NSSAAF during execution of previous NSSAA procedure (i.e. result+timestamp). In this case, the AMF takes a decision whether to repeat NSSAA or not (e.g. depending on how recent the previous NSSAA info took place).

Alternatively, the UDM may further process the NSSAA Result status information and provide an indication to AMF of whether previous NSSAA is still valid and thus AMF does not need to repeat it.

Either case, the AMF shall initiate NSSAA procedure for those S-NSSAIs subject to NSSAA and for which the UDM does not provide NSSAA Result Status information.

At step 6, the AMF triggers NSSAA for those S-NSSAIs subject to NSSAA and for which the UDM does not provide NSSAA Result Status information or the provided NSSAA Result status information indicates that NSSAA is still needed.

Mobility Procedures to EPC and AMFs not Supporting NSSAA

After the UE registration via an AMF supporting NSSAA procedures and the execution of NSSAA for relevant S-NSSAIs requiring NSSAA, the UE may move to EPC or to other AMFs not supporting NSSAA. When the UE moves to EPC, it is assumed that the UE will not be able to use the S-NSSAIs subject to NSSAA using existing procedures.

When the UE moves to an AMF not supporting NSSAA from an AMF supporting NSSAA, some embodiments provide that the old AMF (supporting NSSAA) does not include NSSAA related information in the UE context transfer to the new AMF (NOT supporting NSSAA). Furthermore, some embodiments provide that the old AMF does not include the S-NSSAIs subject to NSSAA as part of the Subscribed S-NSSAI list provided to the AMF in order to prevent the UE from using S-NSSAIs requiring NSSAA when the UE is served by an AMF not supporting NSSAA. To enable that the old/source AMF knows whether an AMF supports NSSAA, an AMF supporting NSSAA provides the information that NSSAA is supported in its NF profile when registering to the NRF. That enables the Consumer AMF to know whether the selected AMF supports NSSAA.

Figure 7:
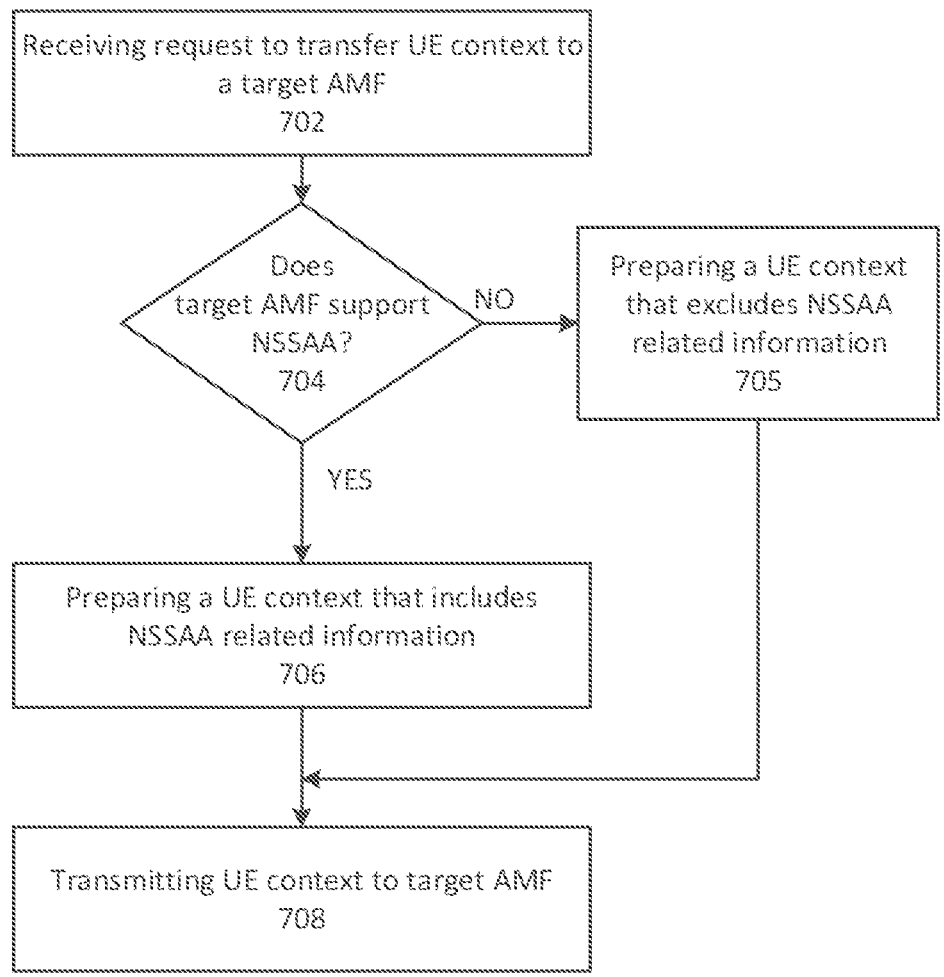
FIG. 7 is a flowchart that illustrates operations of a core network node according to some embodiments.

Accordingly, referring to FIG. 7, a method of operating a core network node in a communication system according to some embodiments includes receiving (702), at a source access and mobility function, AMF, a request to transfer a user equipment, UE, context to a target AMF, responsive to the request, determining (704) whether the target AMF supports Network Slice-Specific Authentication and Authorization, NSSAA, preparing (705), a UE context for the UE, wherein the UE context excludes NSSAA related information when the target AMF does not support NSSAA, and transmitting (708) the UE context to the target AMF.

There may also be a need to adapt other parts of the UE Context, such as. the NSSAI information and PDU Sessions (PDN Connections for EPS), such that the Allowed NSSAI may exclude the S-NSSAIs that are subject to NSSAA. If that is the case, then the PDU Sessions using those S-NSSAIs are to be released, and will not included in the UE context sent to the target AMF (or target MME as PDN Connections—EPS Bearer ID list).

The UE context includes a list of Single-Network Slice Selection Assistance Information, S-NSSAI, associated with the UE, and wherein the list of S-NSSAI excludes S-NSSAI that are subject to NSSAA.

Determining whether the target AMF supports NSSAA may include checking a network function profile of the target AMF at a network repository function, NRF.

Referring to FIGS. 7 and 10, a network node (200) according to some embodiments may be configured to receive (702), at a source access and mobility function, AMF, a request to transfer a user equipment, UE, context to a target AMF, responsive to the request, determine (704) whether the target AMF supports Network Slice-Specific Authentication and Authorization, NSSAA, prepare (705), a UE context for the UE, wherein the UE context excludes NSSAA related information when the target AMF does not support NSSAA, and transmit (708) the UE context to the target AMF.

Referring to FIGS. 7 and 10, a network node (200) according to some embodiments includes a processing circuit (206), a network interface (204) coupled to the processing circuit, and a memory (20) coupled to the processing circuit. The memory includes computer readable program instructions that, when executed by the processing circuit, cause the network node to perform operations including receiving (702), at a source access and mobility function, AMF, a request to transfer a user equipment, UE, context to a target AMF, responsive to the request, determining (704) whether the target AMF supports Network Slice-Specific Authentication and Authorization, NSSAA, preparing (705), a UE context for the UE, wherein the UE context excludes NSSAA related information when the target AMF does not support NSSAA, and transmitting (708) the UE context to the target AMF.

AAA-S Initiated NSSAA Procedures

Figure 3:
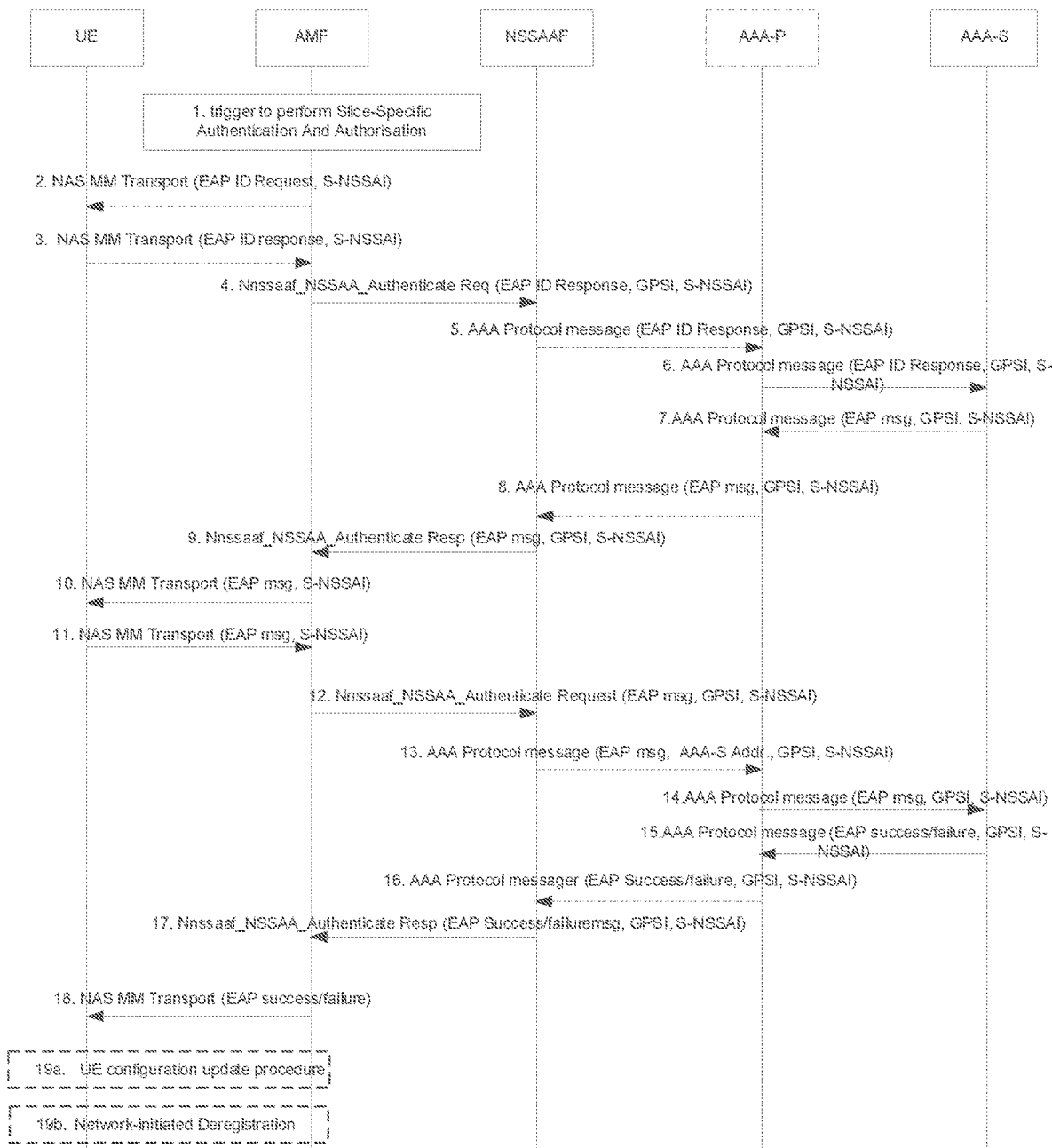
FIG. 3 illustrates a network slice-specific authentication and authorization.
Figure 8A:
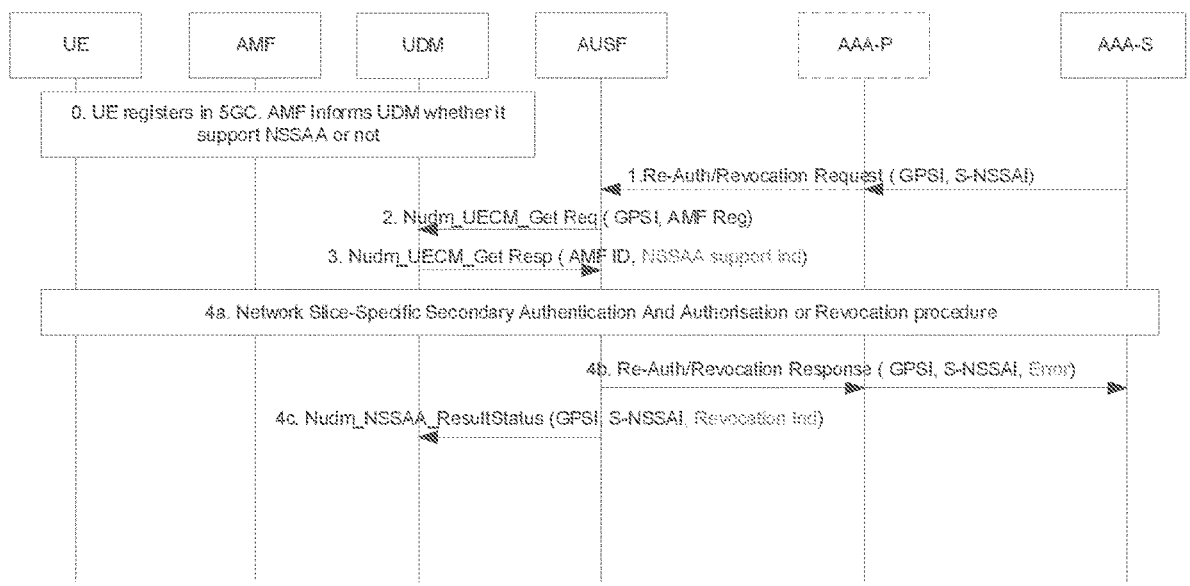
FIG. 8A illustrates an AAA-S initiated NSSAA procedure according to some embodiments.

In addition to the NSSAA procedure shown in FIG. 3, [1] also defines mechanisms for AAA-S initiated Re-authentication and revocation. Some embodiments provide improvements for the AAA-S initiated NSSAA procedures. An AAA-S initiated procedure according to some embodiments is illustrated in FIG. 8A. Referring to FIG. 8A, in step 0, the UE registers in 5GC via an AMF supporting NSSAA and NSSAA procedures are executed. This includes the feature negotiation of NSSAA procedures between AMF and UDM as described above. The knowledge of whether the AMF supports NSSAA or not is stored in UDM/UDR.

In step 1, the AAA-S initiates a Network Slice Specific Re-authentication or Revocation procedure for a given UE (identified by GPSI) and S-NSSAI via the NSSAAF as currently defined (see S2-1910342 [2]).

In step 2, the NSSAAF requests UDM for information regarding the AMF serving the UE using the Nudm_UECM_Get (GPSI, AMF Registration) service operation as currently defined in [1].

In step 3, the UDM responds with the AMF ID serving the UE, if any. Some embodiments provide that additionally, the UDM provides an indication to the NSSAAF of whether the AMF supports NSSAA procedures or not. Alternatively, some embodiments provide that the UDM only provides an AMF ID to the NSSAAF if the UE is registered in 5GC via an AMF supporting NSSAA procedures (i.e. no AMF ID is returned if the registered AMF does not support NSSAA).

In step 4a, if the UE is registered in an AMF supporting NSSAA, then the NSSAAF proceeds with the Network Slice Specific re-authentication or revocation procedure.

In step 4b, otherwise, if the UE is registered in an AMF NOT supporting NSSAA, some embodiments provide that NSSAAF informs the AAA-S about the error condition.

In step 4c, in case of revocation, some embodiments provide that the NSSAA Status information in UDM is updated to indicate that the AAA-S has revoked the access to the corresponding S-NSSAI. The NSSAAF could make use of the Nudm_NSSAA_ResultStatus service to provide this revocation indication or any other service operation. The information about revoked S-NSSAIs is also provided to AMF in step 3 of FIG. 6, so that the AMF ensures that the UE is not allowed to use revoked S-NSSAIs, or for non-supporting AMFs the UDM omits the S-NSSAI in the subscribed S-NSSAIs list sent to the AMF.

Figure 8B:
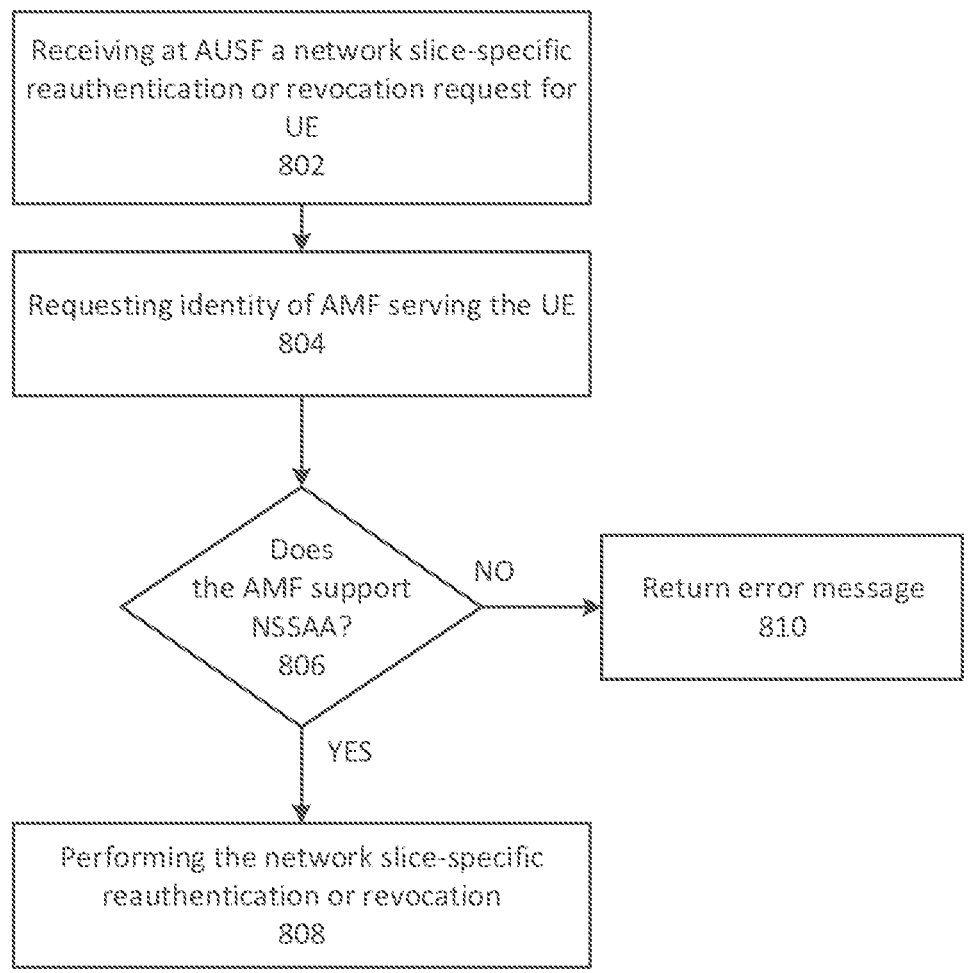
FIG. 8B is a flowchart that illustrates operations of a core network node according to some embodiments.

Accordingly, referring to FIG. 8B, a method of operating a core network node in a communication system according to some embodiments includes receiving (802), at a network slice-specific authentication and authorization function, NSSAAF, a network slice-specific re-authentication or revocation request for a user equipment, UE, from an Authentication, Authorization and Accounting function, AAA, requesting (804) an identity of an access and mobility function, AMF, serving the UE, determining (806) whether the AMF supports Network Slice-Specific Authentication and Authorization, NSSAA, and in response to determining that the AMF supports NSSAA, performing (808) the network slice-specific re-authentication or revocation.

The method may further include storing a result of the network slice-specific re-authentication or revocation along with a Single-Network Slice Selection Assistance Information, S-NSSAI, associated with the UE.

The result of the network slice-specific re-authentication or revocation may be stored in a unified data management function, UDM.

The method may further include, in response to determining that the AMF does not support NSSAA, informing (810) the AAA of an error condition. This could be extended to the case where the UE is in EPC or when the UE is not registered at all in any access.

Determining whether the AMF supports NSSAA may include receiving, with the identity of the AMF serving the UE, an indication of whether the AMF supports NSSAA. Alternatively, the UDM upon determining that the AMF does not support NSSAA, may not include an AMF ID in the response to the NSSAAF.

Referring to FIGS. 8B and 10, a network node (200) according to some embodiments may be configured to receive (802), at a network slice-specific authentication and authorization function, NSSAAF, a network slice-specific re-authentication or revocation request for a user equipment, UE, from an Authentication, Authorization and Accounting function, AAA, request (804) an identity of an access and mobility function, AMF, serving the UE, determine (806) whether the AMF supports Network Slice-Specific Authentication and Authorization, NSSAA, and in response to determining that the AMF supports NSSAA, perform (808) the network slice-specific re-authentication or revocation.

Referring to FIGS. 8B and 10, a network node (200) according to some embodiments includes a processing circuit (206), a network interface (204) coupled to the processing circuit, and a memory (20) coupled to the processing circuit. The memory includes computer readable program instructions that, when executed by the processing circuit, cause the network node to perform operations including receiving (802), at a network slice-specific authentication and authorization function, NSSAAF, a network slice-specific re-authentication or revocation request for a user equipment, UE, from an Authentication, Authorization and Accounting function, AAA, requesting (804) an identity of an access and mobility function, AMF, serving the UE, determining (806) whether the AMF supports Network Slice-Specific Authentication and Authorization, NSSAA, and in response to determining that the AMF supports NSSAA, performing (808) the network slice-specific re-authentication or revocation.

Figure 8C:
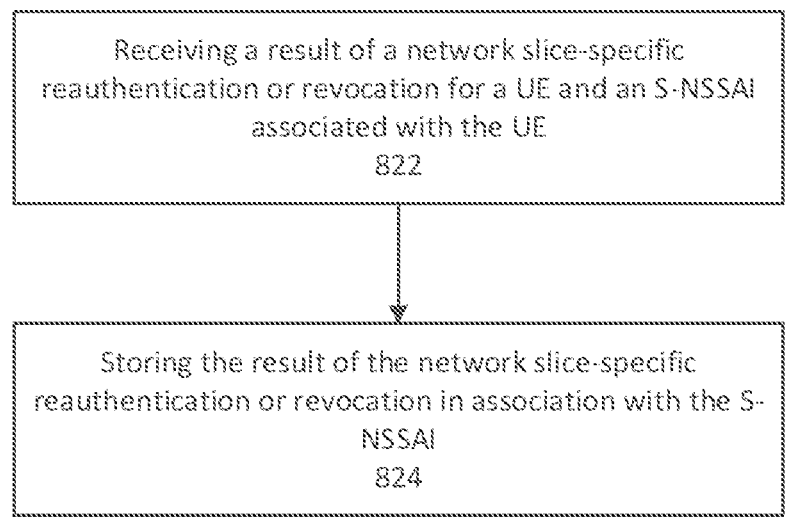
FIG. 8C is a flowchart that illustrates operations of a core network node according to some embodiments.

Referring to FIG. 8C, a method of operating a network node (200) in a communication system, according to some embodiments includes receiving (822) a result of a network slice-specific re-authentication or revocation for a user equipment, UE, and a Single-Network Slice Selection Assistance Information, S-NSSAI, associated with the UE, and storing (824) the S-NSSAI in association with the result of a network slice-specific re-authentication or revocation.

The network node may include a unified data management function, UDM, node. In some embodiments, the network node may include an access and mobility function, AMF, node.

Referring to FIGS. 8C and 10, a network node (200) according to some embodiments may be configured to receive (822) a result of a network slice-specific re-authentication or revocation for a user equipment, UE, and a Single-Network Slice Selection Assistance Information, S-NSSAI, associated with the UE, and store (824) the S-NSSAI in association with the result of a network slice-specific re-authentication or revocation.

Referring to FIGS. 8C and 10, a network node (200) according to some embodiments includes a processing circuit (206), a network interface (204) coupled to the processing circuit, and a memory (20) coupled to the processing circuit. The memory includes computer readable program instructions that, when executed by the processing circuit, cause the network node to perform operations including receiving (822) a result of a network slice-specific re-authentication or revocation for a user equipment, UE, and a Single-Network Slice Selection Assistance Information, S-NSSAI, associated with the UE, and storing (824) the S-NSSAI in association with the result of a network slice-specific re-authentication or revocation.

According to some embodiments, the NSSAA result status information and other information related to the execution of NSSAA procedures stored in UDM/UDR and provided to the AMF over the Nudm_SDM_Get service as described above may be defined as shown in Table 2.

TABLE 2

NSSAA Information Within UE Subscription Data Types

| Subscription data type | Field | Description |
|---|---|---|
| Access and Mobility Registration and Mobility Management) | Subscribed S-NSSAIs | The Network Slices that the UE subscribes to. In the roaming case, it indicates the subscribed Network Slices applicable to the Serving PLMN. The UDM does not include in this list those S-NSSAIs subject to NSSAA when the requesting AMF does not support NSSAA procedures. |
| | S-NSSAIs subject to NSSAA NOTE: this element is not currently defined in TS 23.502 [2] but it should according to other description within the TS and TS 23.501. | The Subscribed S-NSSAIs that are subject to Network Slice-Specific Authentication and Authorization and associated AAA Server Address. The UDM does not include this element when the requesting AMF does not support NSSAA procedures. |
| | NSSAA status information | Result and time of NSSAA procedure per each S-NSSAI subject to NSSAA. Alternatively, UDM can already provide indication of whether a previous NSSAA procedure for that S-NSSAI is still valid. Also indicates whether S-NSSAI is revoked. The UDM does not include this element when the requesting AMF does not support NSSAA procedures. |

Some embodiments provide an option for avoiding NSSAA after mobility from EPS to 5GS. Upon such mobility, the PGW-C+SMF selects only or preferably S-NSSAIs that are not subject to NSSAA when the UE establishes PDN Connection in EPS. When a PDN Connection is established in EPS the PGW-C+SMF selects an S-NSSAI for the PDN Connection as stated in clause 4.11.0a.5 of [1] as follows:

"In case the PGW-C+SMF supports more than one S-NSSAI and the APN is valid for more than one S-NSSAI, before the PGW-C+SMF provides an S-NSSAI to the UE, the PGW-C+SMF should check such that the selected S-NSSAI is among the UE's subscribed S-NSSAIs by retrieving the Subscribed S-NSSAI from UDM using the Nudm_SDM_Get service operation (the PGW-C+SMF discovers and selects a UDM as described in clause 6.3.8 of [2]). If the PGW-C+SMF is in a VPLMN, the PGW-C+SMF uses the Nnssf_NSSelection_Get service operation to retrieve a mapping of the Subscribed S-NSSAIs to Serving PLMN S-NSSAI values."

According to some embodiments, the PGW-C+SMF may in addition check whether the subscribed S-NSSAI is subject to NSSAA, and if that is the case the PGW-C+SMF may select another subscribed S-NSSAI that is not subject to NSSAA if available. If there is no other S-NSSAI available, then PGW-C+SMF can either reject the PDN Connection establishment to the UE or such that the MME is able to select another PGW-C+SMF.

Figure 8D:
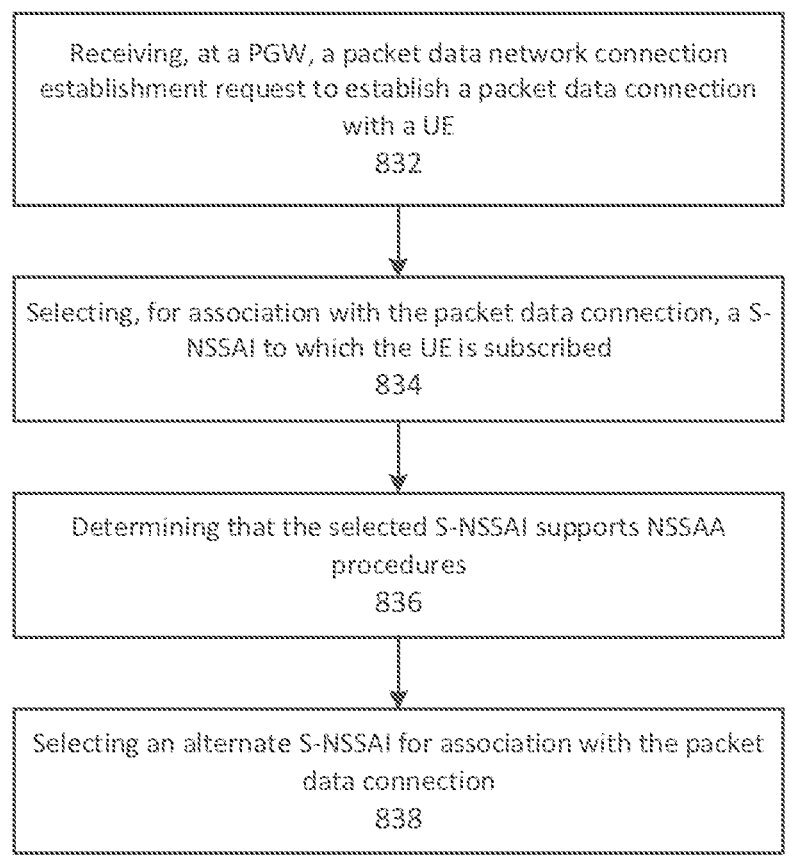
FIG. 8D is a flowchart that illustrates operations of a core network node according to some embodiments.

Accordingly, some embodiments are illustrated in FIG. 8D. As shown therein, a method of operating a core network node in a communication system includes receiving, at a packet gateway, PGW, a packet data network connection establishment request to establish a packet data connection with a user equipment, UE (block 832). The core network node selects, for association with the packet data connection, a Single-Network Slice Selection Assistance Information, S-NSSAI, to which the UE is subscribed (block 834). The core network node determines whether the selected S-NSSAI supports Network Slice-Specific Authentication and Authorization, NSSAA procedures (block 836), and, in response to determining that the selected S-NSSAI supports NSSAA procedures, selects an alternate S-NSSAI for association with the packet data connection (block 838).

Whether the selected S-NSSAI supports NSSAA procedures may be determined by retrieving the selected S-NSSAI from a unified data management, UDM, function in the communication system.

The method may further include determining whether any S-NSSAI to which the UE is subscribed is not subject to NSSAA, and in response to determining that no S-NSSAI to which the UE is subscribed is not subject to NSSAA, rejecting the packed data connection establishment request.

Consequently, if 5GS support for NSSAA is homogenous and is always executed for S-NSSAIs subject to NSSAA when in 5GS and PGW-C+SMF logic above is implemented, there is no need to additionally apply logic to decide whether to execute NSSAA after a mobility from EPS to 5GS.

In some embodiments, instead of the NSSAAF storing the result of the NSSAA procedure, the AMF may store the result of the NSSAA procedure. The AMF may store the NSSAA status information in UDM (e.g. using a Nudm_SDM_Get service operation) after the NSSAA is executed or before AMF re-allocation.

Figure 9:
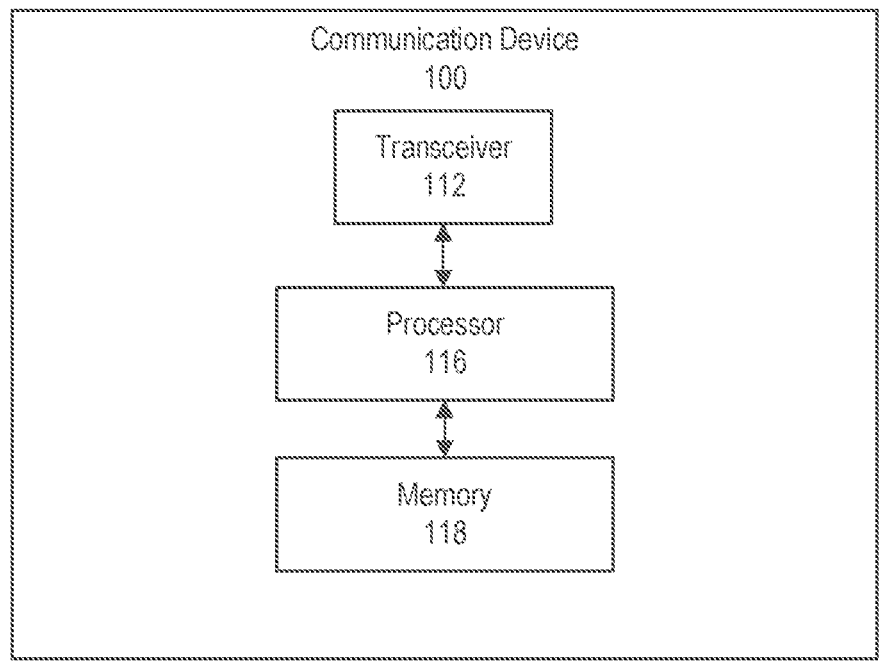
FIG. 9 is a block diagram illustrating an example of a communication device according to some embodiments.

FIG. 9 depicts an example of a communication device 100 of a wireless communication network configured to provide wireless communication according to embodiments of inventive concepts. As shown, the communication device 100 may include a transceiver circuit 112 (also referred to as a transceiver) including a transmitter and a receiver configured to provide uplink and downlink radio communications with wireless devices. The communication device 100 may also include a processor circuit 116 (also referred to as a processor) coupled to the transceiver circuit 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein. According to other embodiments, processor circuit 116 may be defined to include memory so that a separate memory circuit is not required.

As discussed herein, operations of the communication device 100 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a communication device 100 according to some embodiments includes a processor circuit 116, a transceiver 112 coupled to the processor circuit, and a memory 118 coupled to the processor circuit, the memory including machine readable program instructions that, when executed by the processor circuit, cause the UE to perform operations described above.

FIG. 10 is a block diagram of a network node 200 according to some embodiments. Various embodiments provide a core network node that includes a processor circuit 206 and a memory 208 coupled to the processor circuit. The memory 208 includes machine-readable computer program instructions that, when executed by the processor circuit, cause the processor circuit to perform some of the operations depicted.

FIG. 10 depicts an example of a core network node 200 of a wireless communication network configured to provide cellular communication according to embodiments of inventive concepts. The network node 200 may include a network interface circuit 204 (also referred to as a network interface) configured to provide communications with other nodes (e.g., with other base stations and/or core network nodes) of the wireless communication network. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the network node 200 may be performed by processor 206 and/or network interface 204. For example, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations. In addition, a structure similar to that of FIG.

10 may be used to implement other network nodes. Moreover, network nodes discussed herein may be implemented as virtual network nodes.

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

UE Registration in 5GC

Embodiment 1. A method of operating a core network node in a communication system, comprising:
  receiving (402), at an access and mobility function, AMF, a registration message from a radio access network node to register a user equipment, UE;
  responsive to the registration message, transmitting (404) a request for information on whether network slices associated with the UE are subject to Network Slice-Specific Authentication and Authorization, NSSAA;
  responsive to the request, receiving (406) a response message including Single-Network Slice Selection Assistance Information, S-NSSAI, information associated with the UE, the S-NSSAI information including NSSAA status information relating to the S-NSSAI information; and determining (408) whether to initiate an NSSAA procedure with the UE based on the S-NSSAI information.

Embodiment 2. The method of Embodiment 1, wherein the request for information on whether the UE is subject to NSSAA is contained in a request message for subscriber data management, SDM, information transmitted by the AMF to a unified data management, UDM function.

Embodiment 3. The method of Embodiment 1 or Embodiment 2, wherein the request message comprises a Nudm_SDM_Get request message and the response message comprises a Nudm_SDM_GetResp response message.

Embodiment 4. The method of any of Embodiments 1 to 3, wherein the S-NSSAI information comprises a list of S-NSSAIs associated with the UE.

Embodiment 5. The method of Embodiment 4, wherein the S-NSSAI information comprises, for each S-NSSAI in the list of S-NSSAIs, an indication of whether the S-NSSAI is subject to NSSAA.

Embodiment 6. The method of any of Embodiments 1 to 4, wherein the S-NSSAI information comprises a list of S-NSSAIs that are subject to NSSAA.

Embodiment 7. The method of any of Embodiments 1 to 6, wherein the registration message is transmitted in connection with an inter-AMF mobility procedure.

Embodiment 8. The method of any of Embodiments 1 to 6, wherein the registration message is transmitted in connection with an inter-system mobility procedure.

Embodiment 9. The method of any of Embodiments 1 to 8, further comprising: initiating the NSSAA procedure in response to the S-NSSAI information.

Embodiment 10. A network node (200), configured to:
  receive (402), at an access and mobility function, AMF, a registration message from a radio access network node to register a user equipment, UE;
  responsive to the registration message, transmit (404) a request for information on whether network slices associated with the UE are subject to Network Slice-Specific Authentication and Authorization, NSSAA;
  responsive to the request, receive (406) a response message including Single-Network Slice Selection Assistance Information, S-NSSAI, information associated with the UE, the S-NSSAI information including NSSAA status information relating to the S-NSSAI information; and determine (408) whether to initiate an NSSAA procedure with the UE based on the S-NSSAI information.

Embodiment 11. A network node (200) comprising:
  a processing circuit (206);
  a network interface (204) coupled to the processing circuit; and
  a memory (208) coupled to the processing circuit, wherein the memory comprises computer readable program instructions that, when executed by the processing circuit, cause the network node to perform operations comprising:
  receiving (402), at an access and mobility function, AMF, a registration message from a radio access network node to register a user equipment, UE;
  responsive to the registration message, transmitting (404) a request for information on whether network slices associated with the UE are subject to Network Slice-Specific Authentication and Authorization, NSSAA;
  responsive to the request, receiving (406) a response message including Single-Network Slice Selection Assistance Information, S-NSSAI, information associated with the UE, the S-NSSAI information including NSSAA status information relating to the S-NSSAI information; and
  determining (408) whether to initiate an NSSAA procedure with the UE based on the S-NSSAI information.

Embodiment 12. The network node of Embodiment 11, wherein the memory further comprises computer readable program instructions that, when executed by the processing circuit, cause the network node to perform operations according to any of Embodiments 1 to 9.

NSSAA Result Status Storage During NSSAA Procedure

Embodiment 13. A method of operating a core network node in a communication system, comprising:
  initiating (504) a Network Slice-Specific Authentication and Authorization, NSSAA procedure for a user equipment, UE;
  receiving (506) an authentication result message indicating success or failure of the NSSAA procedure; and
  storing (508) a result of the NSSAA procedure.

Embodiment 14. The method of Embodiment 13, wherein the authentication result message comprises an NSSAA procedure result associated with a Single-Network Slice Selection Assistance Information, S-NSSAI.

Embodiment 15. The method of Embodiment 14, wherein storing the result of the NSSAA procedure comprises storing the result of the NSSAA procedure in association with the S-NSSAI.

Embodiment 16. The method of Embodiment 14 or 15, wherein storing the result of the NSSAA procedure comprises storing a Generic Public Subscription Identifier, GPSI, of the UE in association with the S-NSSAI.

Embodiment 17. The method of Embodiment 14 or 15, wherein storing the result of the NSSAA procedure comprises storing a Subscriber Permanent Identifier, SUPI, of the UE in association with the S-NSSAI.

Embodiment 18. The method of any of Embodiments 13 to 17, wherein storing the result of the NSSAA procedure comprises transmitting the result of the NSSAA procedure to a unified data management, UDM, function for storage.

Embodiment 19. The method of any of Embodiments 13 to 18, wherein storing the result of the NSSAA procedure comprises storing a timestamp in association with the result of the NSSAA procedure.

Embodiment 20. The method of any of Embodiments 13 to 19, further comprising receiving (502) an authentication request to perform NSSAA for the UE, wherein the NSSAA procedure is initiated in response to the authentication request.

Embodiment 21. A network node (200), configured to:
initiate (504) a Network Slice-Specific Authentication and Authorization, NSSAA, procedure for a user equipment, UE;
receive (506) an authentication result message indicating success or failure of the NSSAA procedure; and
store (508) a result of the NSSAA procedure.

Embodiment 22. A network node (200) comprising:
a processing circuit (206);
a network interface (204) coupled to the processing circuit; and
a memory (208) coupled to the processing circuit, wherein the memory comprises computer readable program instructions that, when executed by the processing circuit, cause the network node to perform operations comprising:
initiating (504) a Network Slice-Specific Authentication and Authorization, NSSAA, procedure for a user equipment, UE;
receiving (506) an authentication result message indicating success or failure of the NSSAA procedure; and
storing (508) a result of the NSSAA procedure.

Embodiment 23. The network node of Embodiment 22, wherein the memory further comprises computer readable program instructions that, when executed by the processing circuit, cause the network node to perform operations according to any of Embodiments 13 to 20.

Mobility Procedures to EPC and AMFs not Supporting NSSAA

Embodiment 24. A method of operating a core network node in a communication system, comprising:
receiving (702), at a source access and mobility function, AMF, a request to transfer a user equipment, UE, context to a target AMF;
responsive to the request, determining (704) whether the target AMF supports Network Slice-Specific Authentication and Authorization, NSSAA;
preparing (705), a UE context for the UE, wherein the UE context excludes NSSAA related information when the target AMF does not support NSSAA; and
transmitting (708) the UE context to the target AMF.

Embodiment 25. The method of Embodiment 25, wherein the UE context includes a list of Single-Network Slice Selection Assistance Information, S-NSSAI, associated with the UE, and wherein the list of S-NSSAI excludes S-NSSAI that are subject to NSSAA.

Embodiment 26. The method of Embodiment 24, wherein determining whether the target AMF supports NSSAA comprises checking a network function profile of the target AMF at a network repository function, NRF.

Embodiment 27. A network node (200), configured to:
receive (702), at a source access and mobility function, AMF, a request to transfer a user equipment, UE, context to a target AMF;
responsive to the request, determine (704) whether the target AMF supports Network Slice-Specific Authentication and Authorization, NSSAA;
prepare (705), a UE context for the UE, wherein the UE context excludes NSSAA related information when the target AMF does not support NSSAA; and
transmit (708) the UE context to the target AMF.

Embodiment 28. A network node (200) comprising:
a processing circuit (206);
a network interface (204) coupled to the processing circuit; and
a memory (208) coupled to the processing circuit, wherein the memory comprises computer readable program instructions that, when executed by the processing circuit, cause the network node to perform operations comprising:
receiving (702), at a source access and mobility function, AMF, a request to transfer a user equipment, UE, context to a target AMF;
responsive to the request, determining (704) whether the target AMF supports Network Slice-Specific Authentication and Authorization, NSSAA;
preparing (705), a UE context for the UE, wherein the UE context excludes NSSAA related information when the target AMF does not support NSSAA; and
transmitting (708) the UE context to the target AMF.

Embodiment 29. The network node of Embodiment 28, wherein the memory further comprises computer readable program instructions that, when executed by the processing circuit, cause the network node to perform operations according to Embodiment 25 or 26.

AAA-S Initiated NSSAA Procedures

Embodiment 30. A method of operating a core network node in a communication system, comprising:
receiving (802), at a network slice-specific authentication and authorization function, NSSAAF, a network slice-specific re-authentication or revocation request for a user equipment, UE, from an Authentication, Authorization and Accounting function, AAA;
requesting (804) an identity of an access and mobility function, AMF, serving the UE;
determining (806) whether the AMF supports Network Slice-Specific Authentication and Authorization, NSSAA; and
in response to determining that the AMF supports NSSAA, performing (808) the network slice-specific re-authentication or revocation.

Embodiment 31. The method of Embodiment 30, further comprising storing a result of the network slice-specific re-authentication or revocation along with a Single-Network Slice Selection Assistance Information, S-NSSAI, associated with the UE.

Embodiment 32. The method of Embodiment 31, wherein the result of the network slice-specific re-authentication or revocation is stored in a unified data management function, UDM.

Embodiment 33. The method of Embodiment 30, further comprising:
in response to determining that the AMF does not support NSSAA, informing (810) the AAA of an error condition.

Embodiment 34. The method of any of Embodiments 30 to 33, wherein determining whether the AMF supports NSSAA comprises receiving, with the identity of the AMF serving the UE, an indication of whether the AMF supports NSSAA.

Embodiment 35. A network node (200), configured to:
- receive (802), at a network slice-specific authentication and authorization function, NSSAAF, a network slice-specific re-authentication or revocation request for a user equipment, UE, from an Authentication, Authorization and Accounting function, AAA;
- request (804) an identity of an access and mobility function, AMF, serving the UE;
- determine (806) whether the AMF supports Network Slice-Specific Authentication and Authorization, NSSAA; and
- in response to determining that the AMF supports NSSAA, perform (808) the network slice-specific re-authentication or revocation.

Embodiment 36. A network node (200) comprising:
- a processing circuit (206);
- a network interface (204) coupled to the processing circuit; and
- a memory (208) coupled to the processing circuit, wherein the memory comprises computer readable program instructions that, when executed by the processing circuit, cause the network node to perform operations comprising:
  - receiving (802), at a network slice-specific authentication and authorization function, NSSAAF, a network slice-specific re-authentication or revocation request for a user equipment, UE, from an Authentication, Authorization and Accounting function, AAA;
  - requesting (804) an identity of an access and mobility function, AMF, serving the UE;
  - determining (806) whether the AMF supports Network Slice-Specific Authentication and Authorization, NSSAA; and
  - in response to determining that the AMF supports NSSAA, performing (808) the network slice-specific re-authentication or revocation.

Embodiment 37. The network node of Embodiment 38, wherein the memory further comprises computer readable program instructions that, when executed by the processing circuit, cause the network node to perform operations according to Embodiments 31 to 34.

Embodiment 38. A method of operating a network node in a communication system, comprising:
- receiving (822) a result of a network slice-specific re-authentication or revocation for a user equipment, UE, and a Single-Network Slice Selection Assistance Information, S-NSSAI, associated with the UE; and
- storing (824) the S-NSSAI in association with the result of a network slice-specific re-authentication or revocation.

Embodiment 39. The method of Embodiment 38, wherein the core network node comprises a unified data management function, UDM, node.

Embodiment 40. The method of Embodiment 38, wherein the core network node comprises an access and mobility function, AMF, node.

Embodiment 41. The method of Embodiment 38, wherein the core network node comprises a network slice-specific authentication and authorization function, NSSAAF, node.

Embodiment 42. A network node (200), configured to:
receive (822) a result of a network slice-specific re-authentication or revocation for a user equipment, UE, and a Single-Network Slice Selection Assistance Information, S-NSSAI, associated with the UE; and
store (824) the S-NSSAI in association with the result of a network slice-specific re-authentication or revocation.

Embodiment 43. A network node (200) comprising:
- a processing circuit (206);
- a network interface (204) coupled to the processing circuit; and
- a memory (208) coupled to the processing circuit, wherein the memory comprises computer readable program instructions that, when executed by the processing circuit, cause the network node to perform operations comprising:
  - receiving (822) a result of a network slice-specific re-authentication or revocation for a user equipment, UE, and a Single-Network Slice Selection Assistance Information, S-NSSAI, associated with the UE; and
  - storing (824) the S-NSSAI in association with the result of a network slice-specific re-authentication or revocation.

Embodiment 44. The network node of Embodiment 43, wherein the memory further comprises computer readable program instructions that, when executed by the processing circuit, cause the network node to perform operations according to Embodiments 38 to 41.

UDM Procedures for Mobility to EPC and AMFs not Supporting NSSAA

Embodiment 45. A method of operating a core network node in a communication system, comprising:
- receiving (522) a result of a Network Slice-Specific Authentication and Authorization, NSSAA procedure for a user equipment, UE associated with a Single-Network Slice Selection Assistance Information, S-NSSAI; and storing (524) a result of the NSSAA procedure in association with the S-NSSAI.

Embodiment 46. The method of Embodiment 45, wherein storing the result of the NSSAA procedure comprises storing a Generic Public Subscription Identifier, GPSI, of the UE in association with the S-NSSAI.

Embodiment 47. The method of Embodiment 45 or 46, wherein storing the result of the NSSAA procedure comprises storing a Subscriber Permanent Identifier, SUPI, of the UE in association with the S-NSSAI.

Embodiment 48. The method of any of Embodiments 45 to 47, wherein storing the result of the NSSAA procedure comprises transmitting the result of the NSSAA procedure to a unified data management, UDM, function for storage.

Embodiment 49. The method of any of Embodiments 45 to 48, wherein storing the result of the NSSAA procedure comprises storing a timestamp in association with the result of the NSSAA procedure.

Embodiment 50. A network node (200), configured to:
- receive (522) a result of a Network Slice-Specific Authentication and Authorization, NSSAA procedure for a user equipment, UE associated with a Single-Network Slice Selection Assistance Information, S-NSSAI; and
- store (524) a result of the NSSAA procedure in association with the S-NSSAI.

Embodiment 51. A network node (200) comprising:
- a processing circuit (206);
- a network interface (204) coupled to the processing circuit; and
- a memory (208) coupled to the processing circuit, wherein the memory comprises computer readable program instructions that, when executed by the processing circuit, cause the network node to perform operations comprising:
receiving (522) a result of a Network Slice-Specific Authentication and Authorization, NSSAA procedure for a user equipment, UE associated with a Single-Network Slice Selection Assistance Information, S-NSSAI; and storing (524) a result of the NSSAA procedure in association with the S-NSSAI.

Embodiment 52. The network node of Embodiment 22, wherein the memory further comprises computer readable program instructions that, when executed by the processing circuit, cause the network node to perform operations according to any of Embodiments 45 to 49.

Explanations for abbreviations from the above disclosure are provided below.

| Abbreviation | Explanation |
| --- | --- |
| 3GPP | 3rd Generation Partnership Project |
| 5G | 5th Generation |
| AAA | Authentication, Authorization and Accounting |
| AF | Application Function |
| AMF | Access and Mobility Management Function |
| AN | Access Network |
| ARPF | Authentication credential Repository and Processing Function |
| AS | Access Stratum |
| CN | Core Network |
| DN | Data Network |
| eNB | Evolved NodeB (a radio base station in LTE) |
| gNB | A radio base station in NR. |
| IETF | Internet Engineering Task Force |
| LTE | Long Term Evolution |
| ME | Mobile Equipment |
| NAS | Non-Access Stratum |
| NF | Network Function |
| NRF | NF Repository Function |
| NEF | Network Exposure Function |
| NSSF | Network Slice Selection Function |
| NPN | Non-Public Network |
| NR | New Radio |
| PCF | Policy Control Function |
| PLMN | Public Land Mobile Network |
| RAN | Radio Access Network |
| RFC | Request for Comments |
| SBA | Service Based Architecture |
| SMF | Session Management Function |
| UPF | User Plane Function |
| UE | User Equipment |
| X2 | Interface/reference point between two eNBs. |
| Xn | Interface/reference point between two gNBs. |
| UL | Uplink |
| DL | Downlink |
| NSSAA | Network Slice-Specific Authentication and Authorization |
| NSSAAF | Network Slice-Specific Authentication and Authorization Function |
| S-NSSAI | Single-Network Slice Selection Assistance Information |
| MME | Mobility Management Entity |
| SGW | Serving Gateway |
| E-UTRAN | Evolved Universal Terrestrial Radio Access Network |
| 5GC | 5G Core Network |
| EPS | Evolved Packet System |
| EPC | Evolved Packet Core |
| NF | Network Function |
| IWF | Interworking Function |
| AUSF | Subscriber Authentication Function |
| NW | Network |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, a "communication device" may be any device intended for accessing services via an access network and configured to communicate over the access network. For instance, the communication device may be, but is not limited to: a user equipment (UE), mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocketstorable, hand-held, computer-comprised, or vehicle-mounted mobile device, enabled to communicate voice and/or data, via a wireless or wireline connection.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
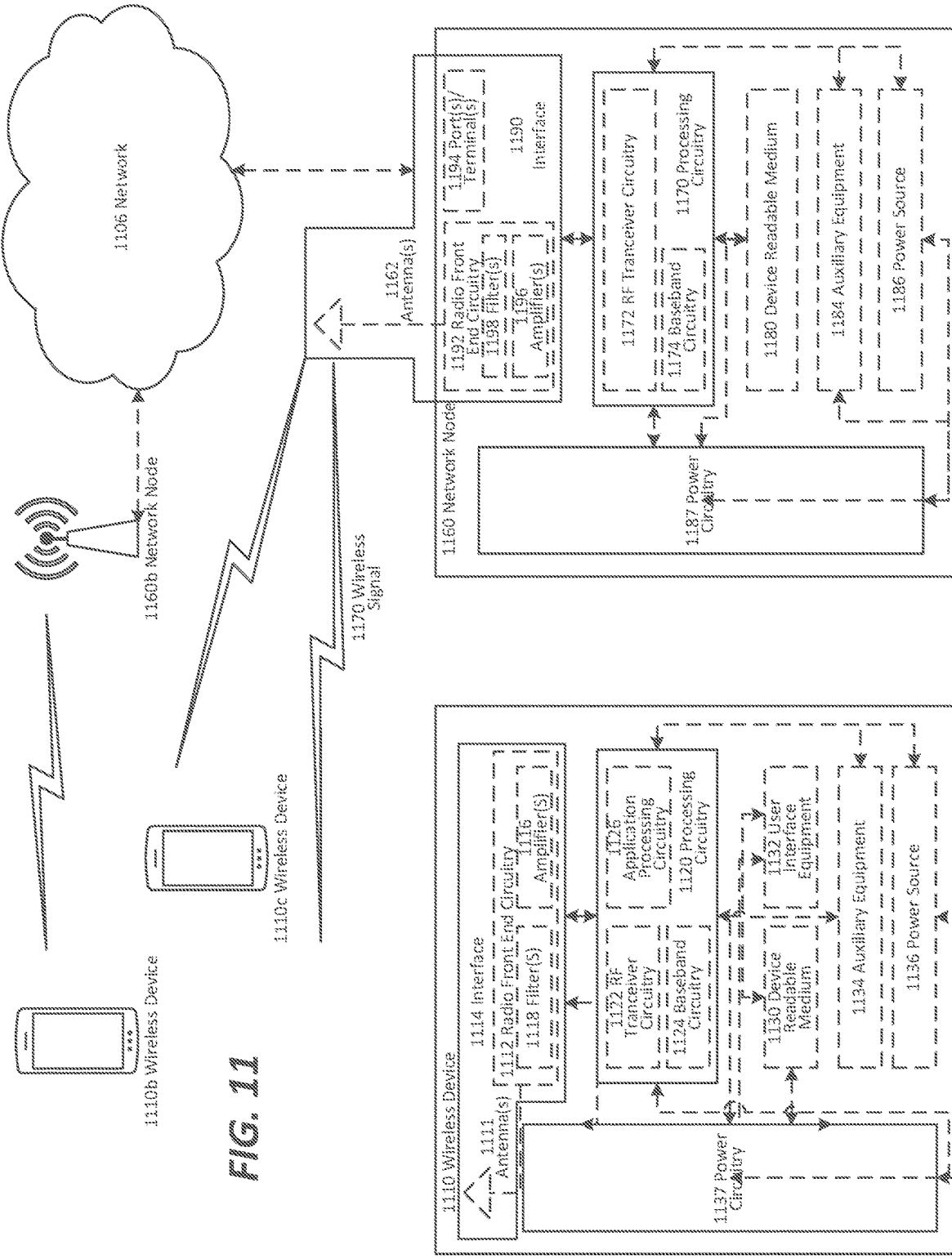
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O & M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated. User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
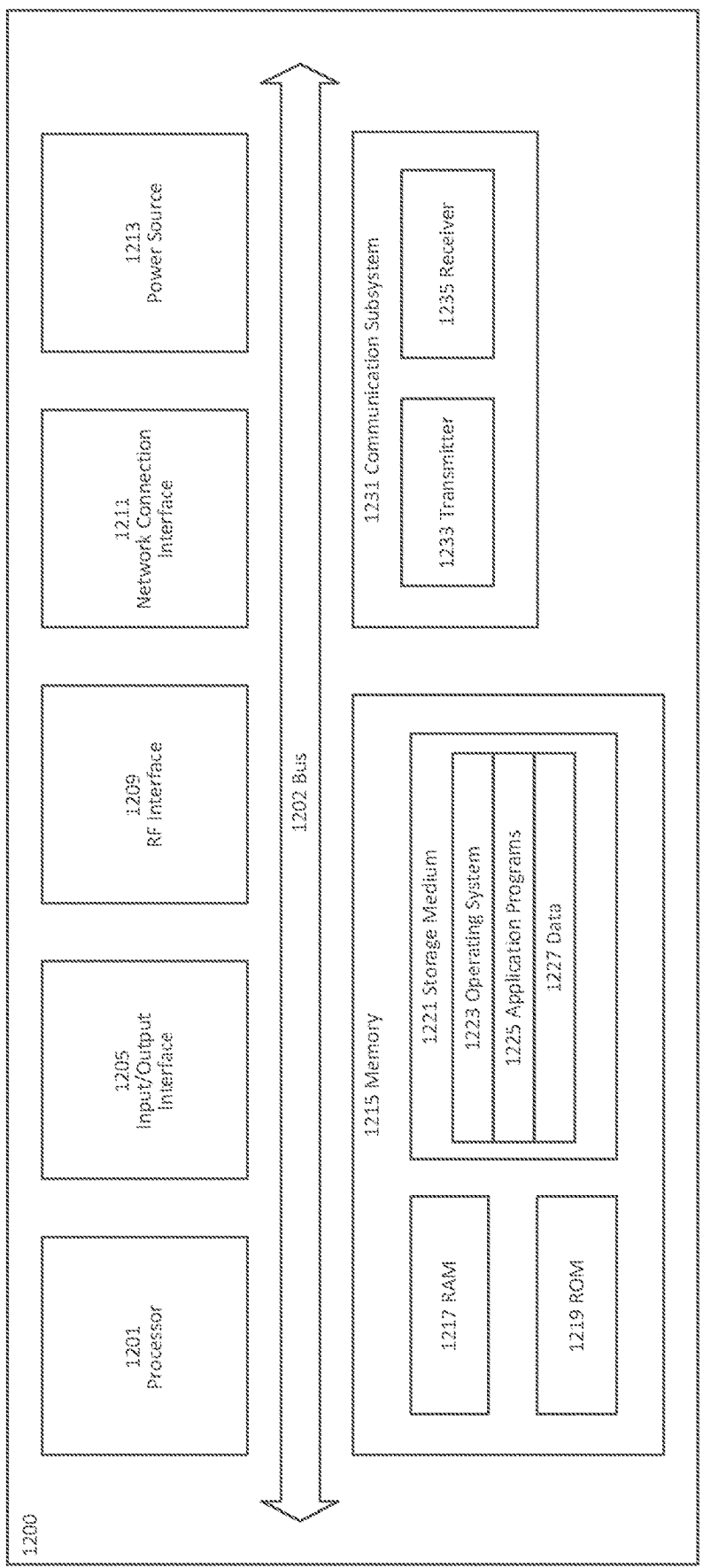
FIG. 12 is a block diagram of a user equipment in accordance with some embodiments.

FIG. 12: User Equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
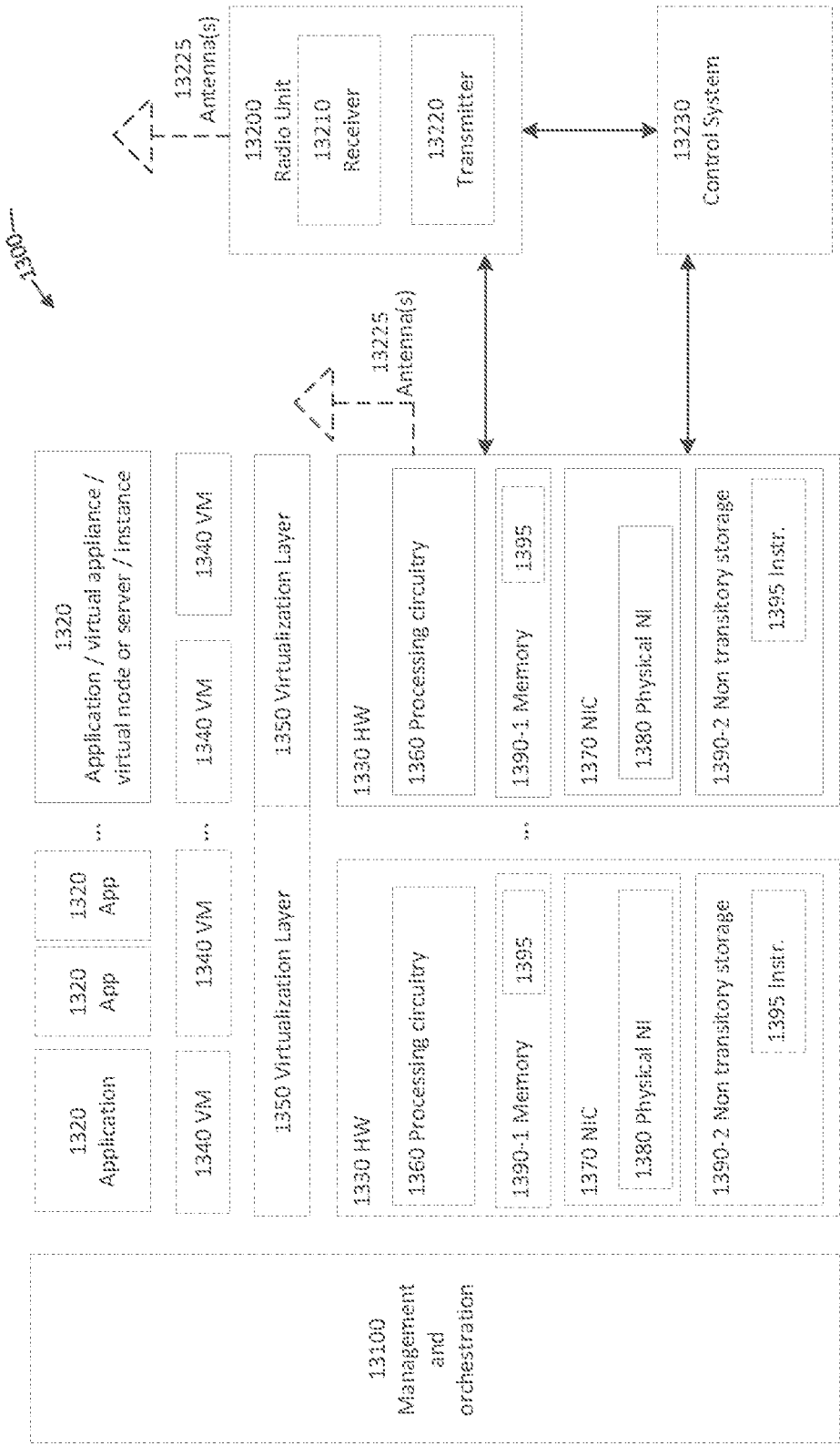
FIG. 13 is a block diagram of a virtualization environment in accordance with some embodiments.

FIG. 13: Virtualization environment in accordance with some embodiments

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
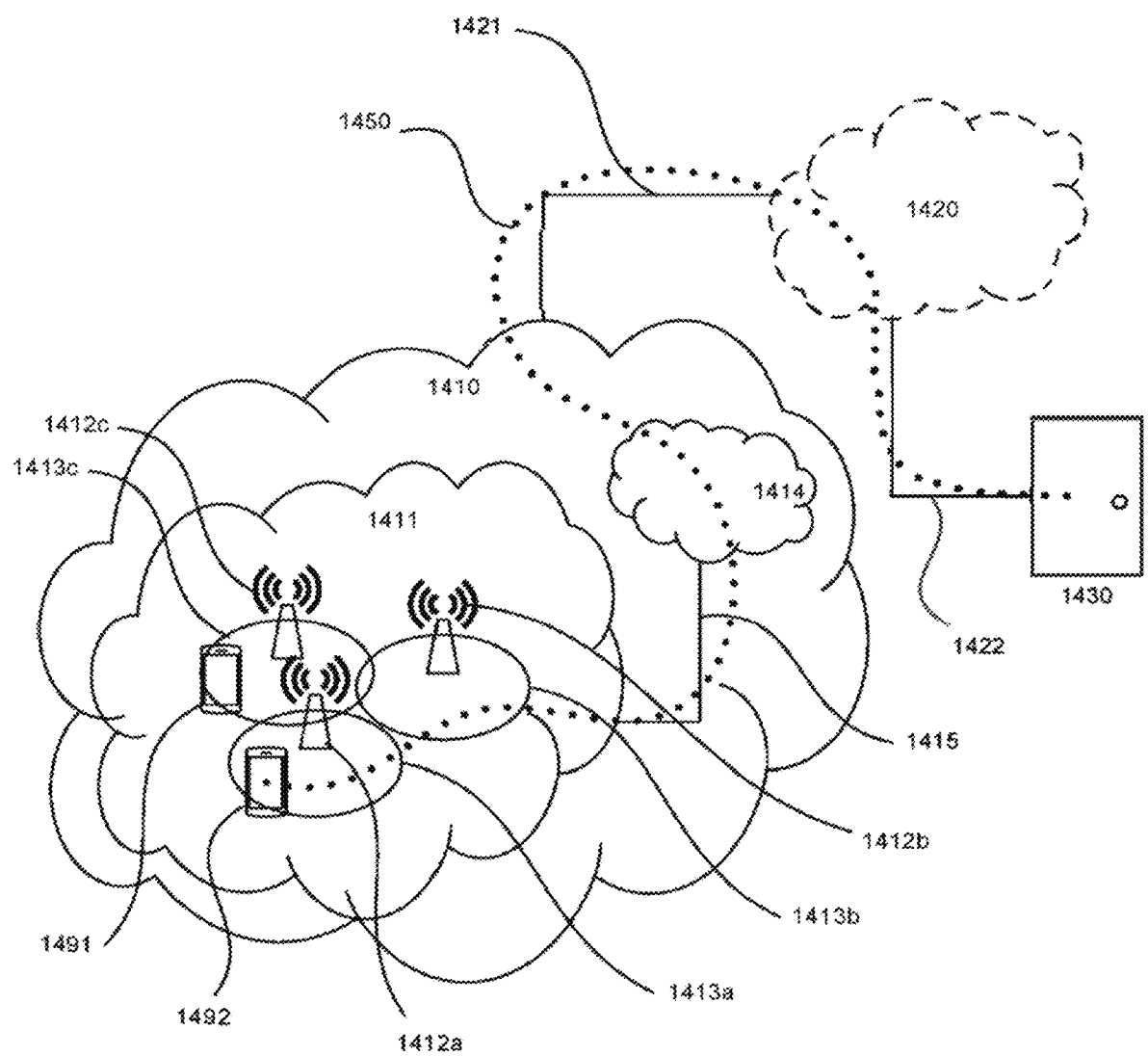
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
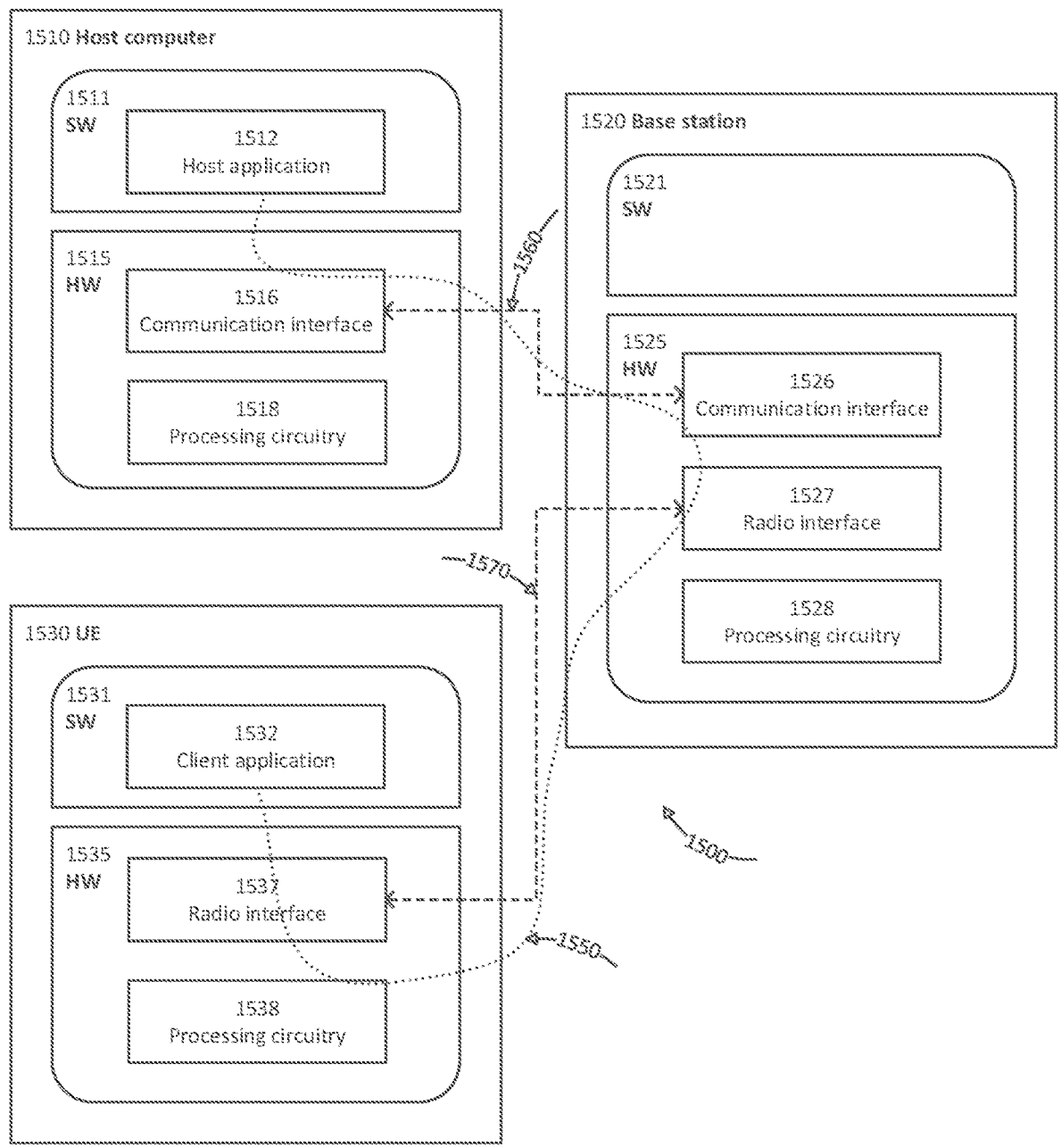
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments may improve the performance of OTT services provided to UE 1530 using OTT connection 1550, in which wireless connection 1570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
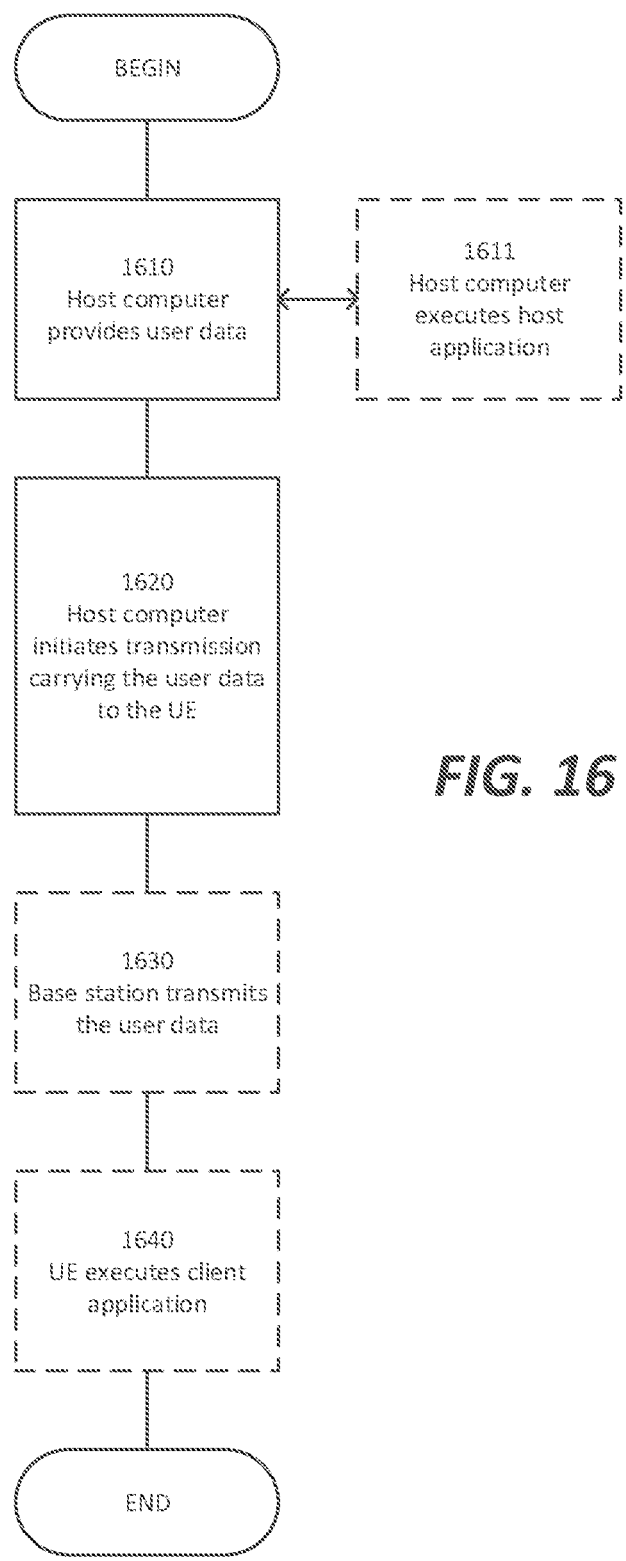
FIG. 16 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
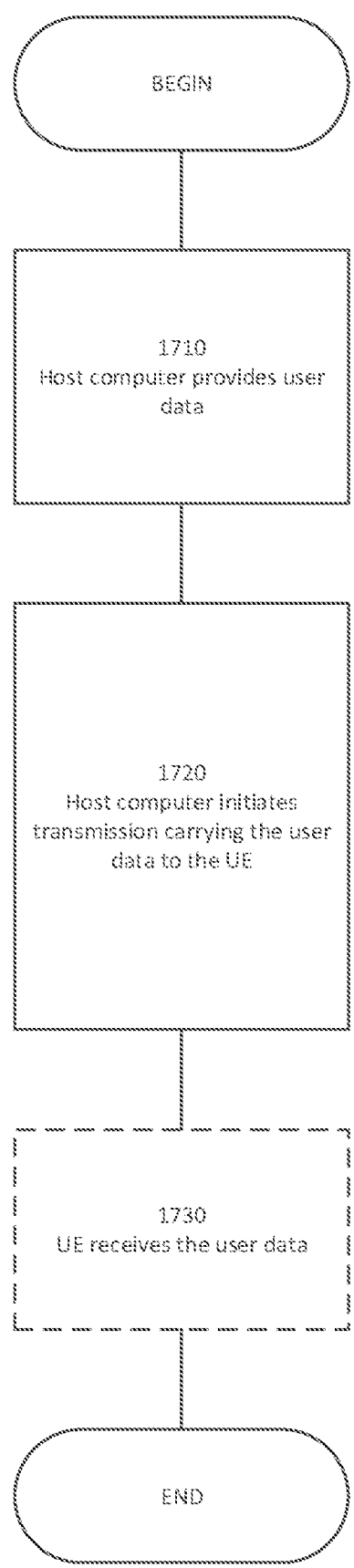
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
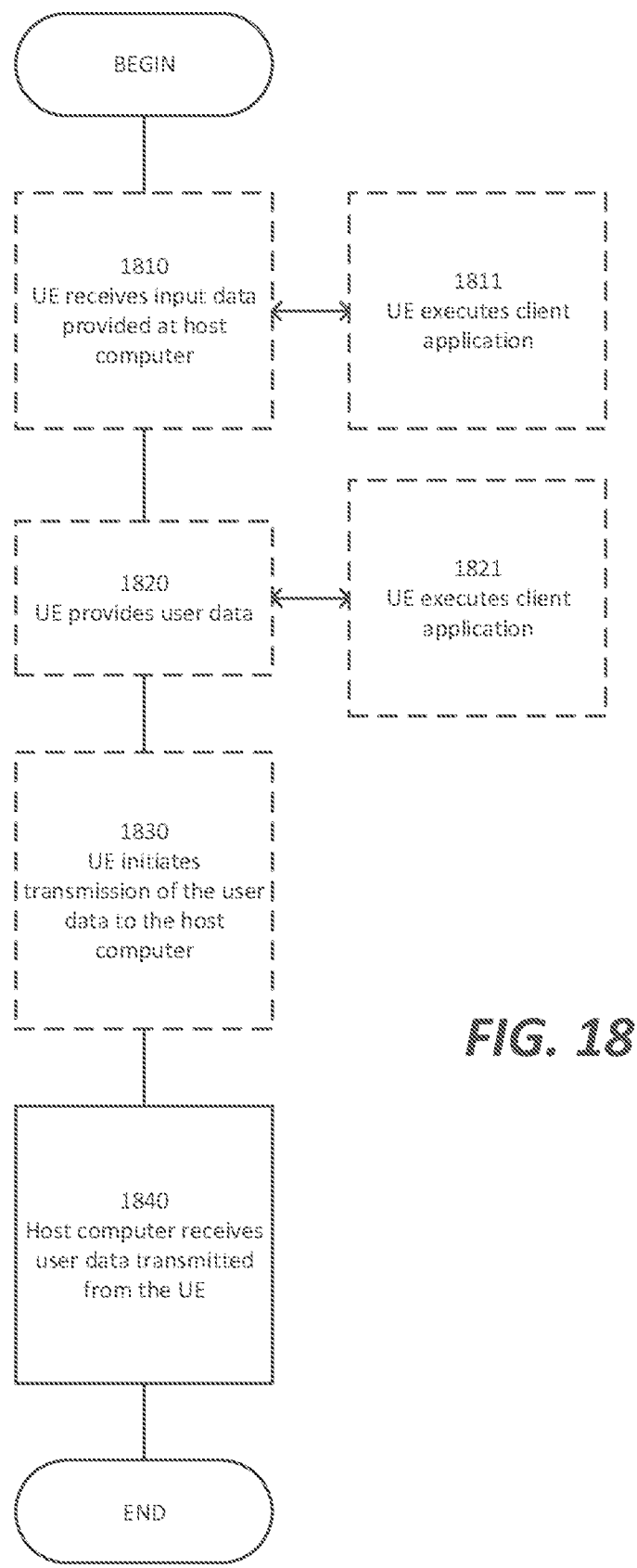
FIG. 18 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
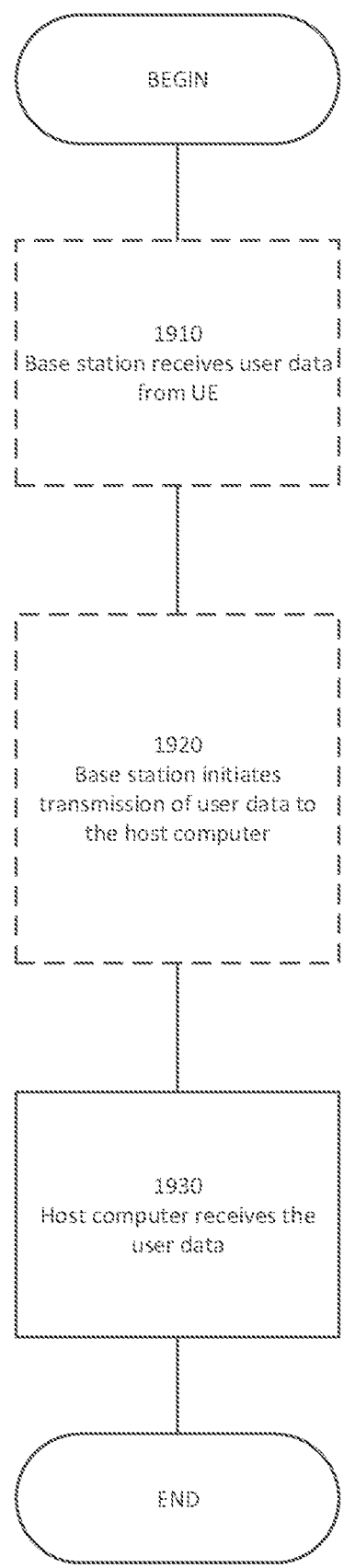
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method of operating a core network node in a communication system, comprising:
   receiving, at a first network function, a registration message from a radio access network node to register a user equipment, UE;
   responsive to the registration message, transmitting a request for information on whether network slices associated with the UE are subject to Network Slice-Specific Authentication and Authorization, NSSAA;
   responsive to the request, receiving a response message including Single-Network Slice Selection Assistance Information, S-NSSAI, information associated with the UE, the S-NSSAI information including NSSAA status information relating to the S-NSSAI information; and
   determining whether to initiate an NSSAA procedure with the UE based on the S-NSSAI information.

2. The method of claim 1, wherein the request for information on whether the UE is subject to NSSAA is contained in a request message for subscriber data management, SDM, information transmitted by the first network function to a second network function.

3. The method of claim 1, wherein the request message comprises a Nudm_SDM_Get request message and the response message comprises a Nudm_SDM_GetResp response message.

4. The method of claim 1, wherein the S-NSSAI information comprises a list of S-NSSAIs associated with the UE.

5. The method of claim 4, wherein the S-NSSAI information comprises, for each S-NSSAI in the list of S-NSSAIs, an indication of whether the S-NSSAI is subject to NSSAA.

6. The method of claim 1, wherein the S-NSSAI information comprises S-NSSAI status information.

7. The method of claim 6, wherein the S-NSSAI information does not include S-NSSAIs in the list of subscribed S-NSSAIs for which NSSAA status has been REVOKED.

8. The method of claim 1, wherein the registration message is transmitted in connection with an intra-system or inter-system mobility procedure.

9. The method of claim 1, further comprising:
   initiating the NSSAA procedure in response to the S-NSSAI information.

10. A network node, configured to:
    receive, at a first network function, a registration message from a radio access network node to register a user equipment, UE;
    responsive to the registration message, transmit a request for information on whether network slices associated with the UE are subject to Network Slice-Specific Authentication and Authorization, NSSAA;
    responsive to the request, receive a response message including Single-Network Slice Selection Assistance Information, S-NSSAI, information associated with the UE, the S-NSSAI information including NSSAA status information relating to the S-NSSAI information; and
    determine whether to initiate an NSSAA procedure with the UE based on the S-NSSAI information.

11. A network node comprising:
    a processing circuit;
    a network interface coupled to the processing circuit; and
    a memory coupled to the processing circuit, wherein the memory comprises computer readable program instructions that, when executed by the processing circuit, cause the network node to perform operations comprising:
- receive, at a first network function, a registration message from a radio access network node to register a user equipment, UE;
- responsive to the registration message, transmit a request for information on whether network slices associated with the UE are subject to Network Slice-Specific Authentication and Authorization, NSSAA;
- responsive to the request, receive a response message including Single-Network Slice Selection Assistance Information, S-NSSAI, information associated with the UE, the S-NSSAI information including NSSAA status information relating to the S-NSSAI information; and
- determine whether to initiate an NSSAA procedure with the UE based on the S-NSSAI information.

12. The network node of claim 11, wherein the memory further comprises computer readable program instructions that, when executed by the processing circuit, cause the network node to perform operations comprising:
- initiating the NSSAA procedure in response to the S-NSSAI information.

* * * * *